(12) United States Patent
Oda et al.

(10) Patent No.: US 8,155,501 B2
(45) Date of Patent: Apr. 10, 2012

(54) REPRODUCING APPARATUS, REPRODUCING METHOD, AND SYSTEM LSI

(75) Inventors: Tomomi Oda, Hiroshima (JP); Taisaku Suzuki, Hiroshima (JP); Yasuyuki Matsuura, Hiroshima (JP)

(73) Assignee: Panasonic Corporation, Osaka (JP)

( * ) Notice: Subject to any disclaimer, the term of this patent is extended or adjusted under 35 U.S.C. 154(b) by 593 days.

(21) Appl. No.: 12/376,353

(22) PCT Filed: Jan. 11, 2008

(86) PCT No.: PCT/JP2008/050233
§ 371 (c)(1),
(2), (4) Date: Feb. 4, 2009

(87) PCT Pub. No.: WO2008/105188
PCT Pub. Date: Sep. 4, 2008

(65) Prior Publication Data
US 2010/0034510 A1 Feb. 11, 2010

(30) Foreign Application Priority Data
Feb. 28, 2007 (JP) ................................. 2007-049914

(51) Int. Cl.
*H04N 9/80* (2006.01)
(52) U.S. Cl. ........................................ 386/241; 386/248
(58) Field of Classification Search .................. 386/200, 386/241, 343, 344, 351
See application file for complete search history.

(56) References Cited

U.S. PATENT DOCUMENTS

| | | | |
|---|---|---|---|
| 6,282,365 B1* | 8/2001 | Gotoh et al. | 386/240 |
| 2003/0194210 A1* | 10/2003 | Shiiyama | 386/68 |
| 2005/0265167 A1* | 12/2005 | Sakon | 369/47.11 |
| 2006/0059426 A1* | 3/2006 | Ogikubo | 715/723 |
| 2006/0120698 A1 | 6/2006 | Kobayashi | |
| 2007/0186229 A1* | 8/2007 | Conklin et al. | 725/14 |
| 2007/0230899 A1 | 10/2007 | Shiiyama | |
| 2009/0016705 A1* | 1/2009 | McCrossan et al. | 386/126 |

FOREIGN PATENT DOCUMENTS

| | | |
|---|---|---|
| JP | 2002-101088 | 4/2002 |
| JP | 2002-223408 | 8/2002 |
| JP | 2003-134472 | 5/2003 |
| JP | 2006-60752 | 3/2006 |
| JP | 2006-135535 | 5/2006 |
| JP | 2007-018623 | 1/2007 |
| WO | 2005/029836 | 3/2005 |
| WO | 2006/129815 | 12/2006 |

OTHER PUBLICATIONS

Supplementary European Search Report issued Dec. 1, 2010 in corresponding European application No. EP 08 70 3097.
International Search Report issued Feb. 12, 2008 in the International (PCT) Application of which the present application is the U.S. National Stage.
Blu-ray Disc Application Definition Blu-ray Disc Format BDJ Baseline Application and Logical Model Definition for BD-ROM, Blu-ray Disc Association, Mar. 2005, pp. 15, 34, 35, 39-45.

* cited by examiner

*Primary Examiner* — Huy T Nguyen
(74) *Attorney, Agent, or Firm* — Wenderoth, Lind & Ponack, L.L.P.

(57) ABSTRACT

A playback apparatus comprises a platform for executing an application, a playback engine for performing AV playback, and a playback control engine. Upon receipt of an instruction from a user, the playback control engine judges the state of the playback apparatus at the moment. If the playback apparatus is in the state of currently performing the AV playback, the playback control engine instructs the playback engine to perform the AV playback at a predetermined speed level. A key event corresponding to the instruction from the user is output to the application on the platform afterwards.

13 Claims, 25 Drawing Sheets

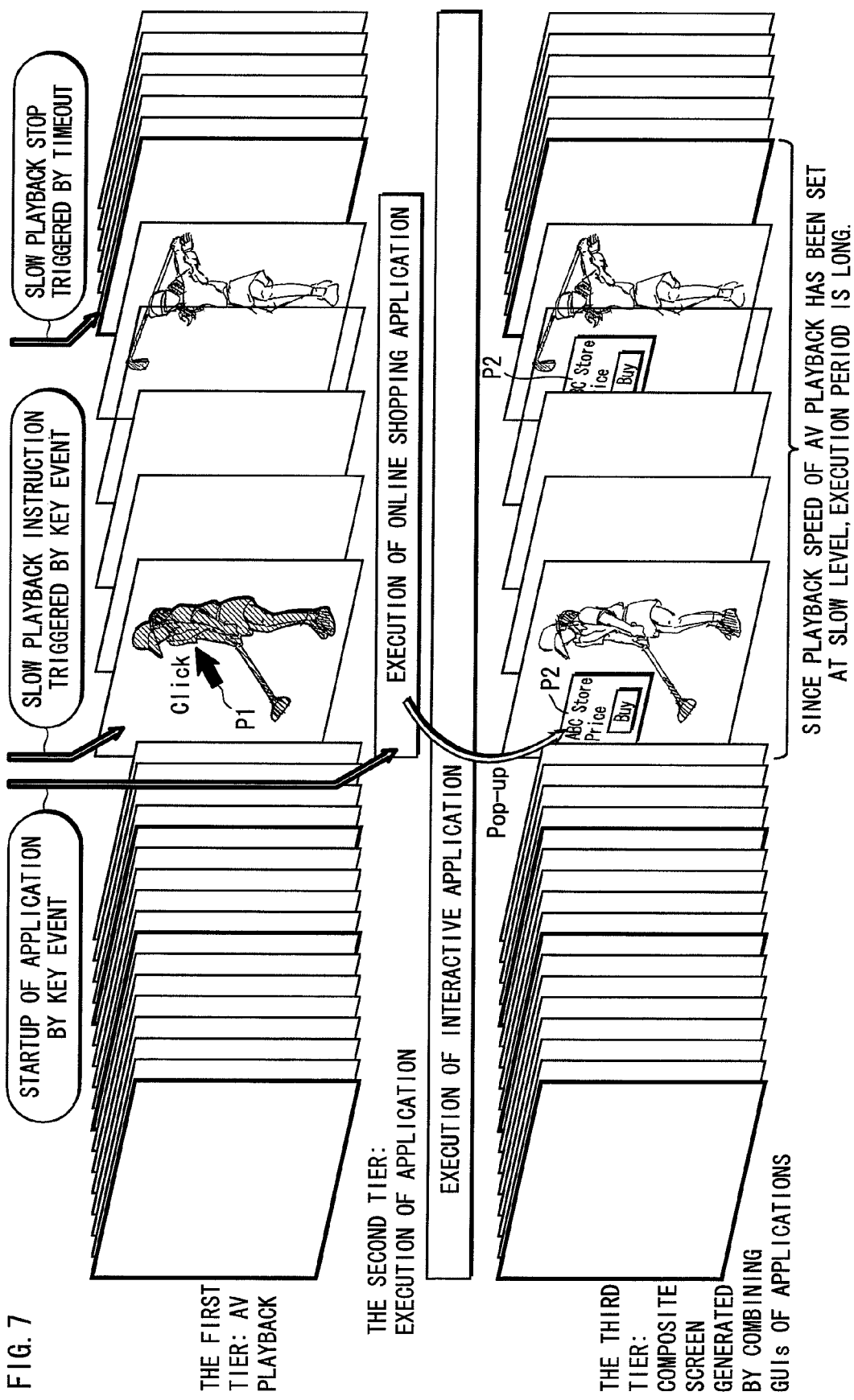

MAIN SUBSTRATE OF RECORDING/PLAYBACK APPARATUS

REPRODUCING APPARATUS, REPRODUCING METHOD, AND SYSTEM LSI

TECHNICAL FIELD

The present invention belongs to a technical field of application control performed in conjunction with AV playback.

BACKGROUND ART

The application control mentioned above is a technique to perform decoding of AV streams and execution of applications in parallel.

Interactive applications designed to operate in conjunction with the AV playback include, for example, applications for realizing a game that is synchronized with video and audio of the main part of a movie, and applications for realizing online shopping during the playback of the main part of a movie by establishing connection with an external server via a telephone line, the Internet or the like. The added value of the playback apparatus is increased when such interactive applications are chosen as the execution objects.

Due to such interactive applications, the user more often controls application programs with a remote control or the like than before. Also, to control various application programs such as games and programs for online shopping, more complicated operations are required than before.

The following Patent Documents 1 and 2 discloses techniques to improve the operability of playback apparatuses.
Patent Document 1: Japanese Laid-open Patent Application Publication No. 2003-134472
Patent Document 2: Japanese Laid-open Patent Application Publication No. 2002-223408

SUMMARY OF THE INVENTION

Problem to be Solved by the Invention

Some of the interactive applications are designed such that user operations using the GUI are valid only within a period for which items for sale are displayed in the frame, on the time line of the AV playback. Such a GUI is intended to promote sales of items relating to the video content, in cooperation with business enterprises that provide online shopping. Here, if the operation using the GUI is, for example, a purchase of an item which requires a careful decision, and if the period for which the GUI is valid has been set to be short by chance, the user might feel rushed. As a result, it could often happen that the user purchases items that he/she does not really want, or the user misses an opportunity to purchase. This can be a cause of customer troubles.

Of course, such a trouble can be prevented if the application developer has set the period for accepting the operation for purchasing of items to be long enough with thoughtful consideration. However, whereas playback apparatuses are developed by the manufacture, applications are developed by software houses and contents developers, and some of such application developers are not aware of the importance of the product quality.

Since the playback apparatuses are required to execute various applications which necessarily include applications developed without consideration of the operability for the users, it is difficult to completely eliminate the causes of customer troubles.

As described above, since the playback apparatuses can not exclude applications developed without consideration of the operability for the users, it can be said that the manufacturers of the playback apparatuses are in a position where they can easily get involved in troubles due to poor structures of GUIs of the applications.

The object of the present invention is to provide a playback apparatus that is capable of complementing poor operability of applications.

Means for Solving the Problem

To solve the problem mentioned above, the present invention provides a playback apparatus comprising: an execution unit operable to execute an application; a playback unit; a receiving unit operable to receive an instruction from a user; and a control unit, wherein if the receiving unit receives the instruction during AV playback by the playback unit, the control unit instructs the playback unit to perform the AV playback at a predetermined speed level, and outputs a key event corresponding to the instruction to the application.

Advantageous Effects of the Present Invention

1. With the stated structure, if the playback apparatus is in the state of performing the AV playback, the control unit instructs the playback unit to perform the AV playback at the predetermined speed level. On the other hand, the operation of the application is in synchronization with the AV playback, and the operation speed of the application is decreased or paused according to the speed of the AV playback. Therefore, the operation speed of the application decreases or the operation pauses according to the instruction by the control unit.

Since the key event corresponding to the instruction from the user is output to the application after the operation speed of the application is decreased or paused, the speed of the interactive control performed by the application will be indirectly adjusted through the control of the AV playback. Therefore, the user can be at easy in considering whether to buy an item.

As a result, the manufacture of the playback apparatus can prevent from getting involved in troubles relating purchase of items by the user.

Even if the GUI of the application has a poor structure which lacks of consideration of the operability, the playback apparatus, having a platform of the application, complements the poor GUI. Therefore, it is possible to realize stable user operation without being affected by the quality of the GUI of the application.

2. As an option, it is possible to add the following inventive feature to the playback apparatus mentioned above, to produce a further effect.

The playback apparatus may further comprise a setup unit operable to receive a setup instruction from the user, wherein the predetermined speed level may be one of speed levels that include a speed level slower than a normal speed level and a speed level for pausing the AV playback.

The function of complementing the operability of the application will be realized by that the user sets the speed level slower than the normal speed level or the speed level for pausing the AV playback at the time of setup or in advance. Since the function of performing the AV playback at a predetermined speed level is that BD-ROM playback apparatuses are commonly provided with, only a few improvements are required for the playback apparatus to complement the operability of the application.

3. It is possible to add the following inventive feature to the playback apparatus mentioned above, to make it more concrete.

The execution unit may keep an execution speed of the application even if the playback unit performs the AV playback at the predetermined speed level.

The execution unit does not perform the execution at a slow speed even if the playback unit performs the AV playback at a slow speed. As a result, it is possible to increase the responsivity to the user's input.

4. It is possible to add the following inventive feature to the playback apparatus mentioned above, to make it more concrete.

As the setup instruction, the setup unit receives a numeric value ranging from 0 to N, the speed level slower than the normal speed level is represented by a numeric value ranging from 1 to N, the speed level for pausing the AV playback is represented by a numeric value 0, and the predetermined speed level is changeable by re-input of a numeric value ranging from 0 to N.

With the inventive feature mentioned above, it becomes possible to input or change the speed level of the AV playback by inputting an arbitrary integer ranging from 0 to N. Accordingly, it is unnecessary for the user to be particularly bothered to complement the operability of the application.

5. It is possible to add the following inventive feature to the playback apparatus mentioned above, to make it more concrete.

The playback apparatus may further comprise: a timer; and a timer management unit operable to manage the timer, wherein using the timer, the timer management unit may measure an elapsed time from receipt of the instruction by the receiving unit, and perform timeout notification when the elapsed time reaches a predetermined time, and the AV playback at the predetermined speed level may be terminated based on the timeout notification by the timer management unit.

With the inventive feature mentioned above, the complement of the operability of the application and the AV playback at the predetermined speed level will be automatically cancelled after the elapse of a predetermined time period. Therefore, the introduction of the complementing function does not cause any extra trouble for the user.

6. It is possible to add the following inventive feature to the playback apparatus mentioned above, to make it more concrete.

The playback apparatus may further comprise: a player state register storing therein a parameter relating to a current state of the playback unit; and a state judgment unit operable to judge, when the receiving unit receives the instruction, whether or not the playback unit is currently performing the AV playback, with reference to the parameter, wherein the control unit may instruct the playback unit to perform the AV playback at the predetermined speed level only if the state judgment unit judges that the playback unit is currently performing the AV playback.

The player state register is an element that BD-ROM playback apparatuses are commonly provided with, and the playback apparatus performs the complement of the operability of the application after confirming that the playback apparatus is currently performing the AV playback, with reference to the player state register. Therefore, only a few improvements are required for the playback apparatus to complement the operability of the application.

7. It is possible to add the following inventive feature to the playback apparatus mentioned above, to make it more concrete.

The application may include an event listener, a key event as a target of speed control, included in a plurality of key events, may have been registered with the event listener, and the control unit may instruct the playback unit to perform the AV playback at the predetermined speed level only if a key event, received by the receiving unit as the instruction, is the target of the speed control registered with the event listener.

Since a key event as a target of speed control, included in a plurality of key events, has been registered with the event listener, it is possible to realize operations in conjunction, that is, for example, when a specific key of the remote control is pressed, the playback apparatus realizes the AV playback at a predetermined speed level while starting up a desired application. This structure further increases the operability of the application because the user can start up the application and realize the AV playback at the predetermined speed level at the same time by only a single action of pressing the specific key.

8. It is possible to add the following inventive feature to the playback apparatus mentioned above, to make it more concrete.

The execution unit may execute the application by generating an instance from class files stored in a recording medium, a class file of a playback speed instruction program may be stored in the recording medium, and the predetermined speed level may be provided to the playback unit by the playback speed instruction program.

9.10. It is possible to add the following inventive feature to the playback apparatus mentioned above, to make it more concrete.

The playback unit may perform the AV playback of a digital stream stored in a recording medium, the digital stream may include speed control information, and the predetermined speed level may be defined in the speed control information.

The speed control information may show a start position and an end position of the digital stream, and in a case where the playback unit is currently performing the AV playback, the control unit may instruct the playback unit to perform the AV playback at the predetermined speed level after the AV playback reaches the start position, and instruct the playback unit to terminate the AV playback at the predetermined speed level after the AV playback reaches the end position.

Since the complement of the operability of the application is executed based on the speed control information included in the digital stream, it is possible to realize the complement in close conjunction with the playback of the digital stream.

11. It is possible to add the following inventive feature to the playback apparatus mentioned above, to make it more concrete.

The playback unit may perform the AV playback of titles stored in a recording medium, class files of the application may be stored in the recording medium, the execution unit may be a platform of a virtual machine, and include a heap memory, a class loader and an application manager, the application manager may perform application signaling of a title boundary on the platform, and when the playback unit starts the AV playback of any of the titles, put the application into an executable state by instructing the class loader to generate, on the heap memory, an instance of any of the class files whose active section corresponds to said any of the titles, the receiving unit may include a user event manager, the user event manager may generate a key event corresponding to the instruction if the instruction is valid for said any of the titles, and transmit the key event to the application in the executable state, and the control unit may instruct the playback unit to perform the AV playback at the predetermined speed level before the key event is transmitted by the user event manager.

Since the complement of the operability of the application cane realized on the platform that operates based on the title signaling, playback apparatuses designed to handle BD-ROMs can easily realize the complementing function pertaining to the present invention.

Also, since the control unit as a component of the present invention can be implemented as an additional module to the user event manager in the playback apparatus, it is possible to realize this complement by a simple addition of the module to the BD-J terminal standard model without making a significant change to the standard model. Therefore, manufactures of playback apparatuses can easily incorporate the speed control function described above into their playback apparatus.

12. It is possible to add the following inventive feature to the playback apparatus mentioned above, to make it more concrete.

An operation mode object may be stored in the recording medium, the operation mode object may be a table that defines an operation mode to be applied to dynamic control of a title when playback of the title is started, and include an application management table and a key interest table that indicates a key that is valid for the title, when the playback of the title is started, the application manager may extract the application management table from the operation mode object that corresponds to the title, and perform the application signaling based on the application management table, when the playback of the title is started, the user event manager may extract the key interest table from the operation mode object that corresponds to the title, and judge whether or not a key received by the receiving unit as the instruction is valid according to the key interest table, and the key event transmitted to the application may correspond to the key that is defined as valid in the key interest table.

The user event manager is an essential component of a player model defined in the BD-J application layer standard, and the complementing function pertaining to the present invention can be realized in conformity with the player model.

13. It is possible to add the following inventive feature to the playback apparatus mentioned above, to make it more concrete.

Playlist information referring to an AV stream may be stored in the recording medium, the operation mode object may include accessible playlist information indicating a playlist that is to be automatically played when an instruction to play back the title is made, the playback unit may perform the AV playback by playing the AV stream based on the playlist indicated by the accessible playlist information, and if the predetermined speed level is slower than the normal speed level, a time length of the title may increase as a playback time length of the AV stream increases.

By extending the playback period of the AV stream which is played back according to the playlist information, the operation period of the application that operates in synchronization with the AV stream can be extended. The operability of the AV stream is indirectly improved through the adjustment of the playback period of the AV stream mentioned above. Therefore, it is easy to realize the complement of the operability of the application in common BD-ROM playback apparatuses.

BRIEF DESCRIPTION OF THE DRAWINGS

FIG. 7 schematically shows an improvement of specifications of operations performed by the applications;
FIG. 8A shows an internal structure of player state information in a player state register 2a.

Figure 1A:
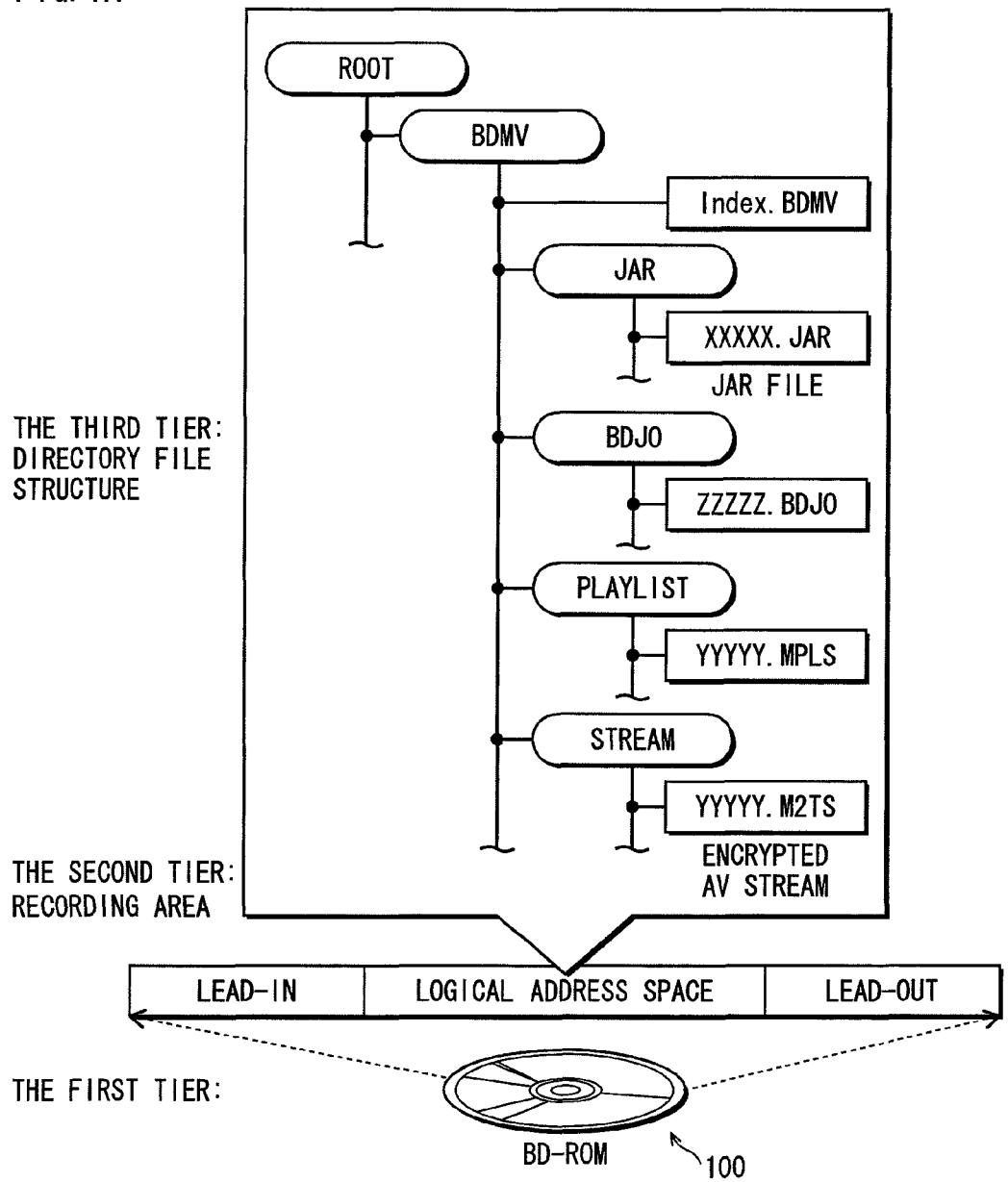
FIG. 1A shows the structure of a BD-ROM 100 as an example of a recording medium used with the present invention.

DESCRIPTION OF REFERENCE NUMERALS 1 playback engine
2 playback control engine
3 BD-J module
4 Java™ virtual machine
5 heap memory
6 application cache
7 class loader
8 application manager
9 user operation manager 11 operation state judgment unit
12 playback speed instruction unit
13 control information setting unit
14 timer management unit

DETAILED DESCRIPTION OF THE INVENTION

The First Embodiment

The following describes an embodiment of the playback apparatus pertaining to the present invention, with reference to the drawings. The playback apparatus causes a Java™ application provided via a BD-ROM to be executed by a virtual machine thereof. Since the BD-ROM is the execution target of the playback apparatus, the internal structure of the BD-ROM is explained firstly, and followed by the explanation of the playback apparatus.

FIG. 1A shows the structure of the BD-ROM 100 as an example recording medium used with this embodiment. The BD-ROM stores therein AV data and application programs.

The first tier of FIG. 1A shows the appearance of the BD-ROM. Like DVDs and CDs, the BD-ROM has a recording area spiraling from the inner circumference to the outer circumference of the BD-ROM.

The second tier depicts the spiral recording area drawn out to the sides. As the second tier shows, the recording area has a logical address space between the lead-in area on the side of the inter circumference and the lead-out area on the side of the outer circumference. The logical address space can store therein the logical data. On the inner side of the lead-in area, a special area called BCA (Burst Cutting Area), which can be read only by the drive. Since the applications can not read this area, it is often used for copyrights protection.

The logical address space stores therein file system information at the top, and also stores AV streams and so on. The file system is, for example, the UDF or the ISO9660. This file system enables reading of logical data from the recording area described above.

The third tier shows the directories and the file structure of the recording area. In the BD-ROM, a BDMV directory is placed directly under a ROOT directory, and a STREAM directory, an MPLS directory, a JAR directory and a BDJO directory exist under the BDMV directory.

<The Structure of the BD-ROM, Part 1: AV Stream>

The following explains the AV stream. The AV stream is a transport stream in the MPEG2-TS format, obtained by the time-division multiplexing of digitized moving pictures, subtitles and audio data. The AV stream is placed under the STREAM directory.

<The Structure of the BD-ROM, Part 2: Playlist Information>

The playlist information defines one or more pairs of an In_Time and an Out_Time on the playback time line of the AV stream, in order to define logical playback sections and playback paths. The playlist information includes a stream number table, which defines valid streams among the elementary streams multiplexed into the AV stream. The stream number table determines, for each of the elementary streams included in the AV stream, whether to permit the playback thereof. The AV playback can be started by the Java™ application instructing the Java™ virtual machine to generate a JMF player instance for playing back the playlist information. The JMF player is actual data generated on a heap memory of the virtual machine, based on the JMF player class.

The pair of the AV stream and the playlist information constitutes a playback unit called "title". The AV playback of the BD-ROM is performed in units of the titles.

<The Structure of the BD-ROM, Part 3: Index.bdmv>

Figure 1B:
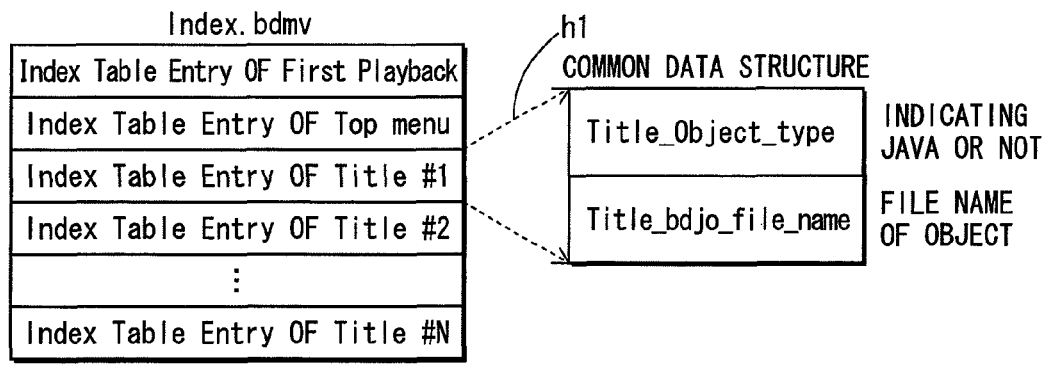
FIG. 1B shows an internal structure of Index.bdmv.

The Index.bdmv is described next. FIG. 1B shows the internal structure of the Index.bdmv. The Index.bdmv is a table for associating an operation mode object to the title, which is a playback unit including the AV stream and the playlist information. The operation mode object is information for determining the operation mode used for dynamic control relating to the title while playing back the title based on the Index.bdmv. There are two types of the operation mode object. One is called "Movie object", which is an operation mode object for defining the dynamic control based on the command interrupter. The other is called "BD-J object", which is an operation mode object for defining the dynamic control based on the Java™ virtual machine.

The BD-ROM stores a various types of titles. The Index.bdmv shown on the left of the FIG. 1B includes indexes respectively defined for the various types of titles. Specifically, this Index.bdmv includes an Index Table Entry for a First Playback, an Index Table Entry for a Top Menu, an Index Table Entry for a Title #1, an Index Table Entry for a Title #2, . . . and an Index Table Entry for a Title #N. This table designates, for each of the titles, the Top Menu and the First Playback, the Movie object or the BD-J object to be executed first. The playback apparatus for the BD-ROM refers to the Index.bdmv every time a title or a menu is called, and executes a designated object. Here, the "First Playback" indicates a Movie object or a BD-J object that is to be automatically executed when the disc is mounted. The First Playback has been set by the content provider. The "Top Menu" indicates a Movie object or a BD-J object that is to be called when a command such as "Menu Call" is executed according to a user's operation from the remote control.

The lead lines h1 in the drawing show the up-close details of the common data structure of the Index Table Entries. The Index Table Entry is defined by this common data structure. This structure includes a "Title_object_type", and a "Title_bdjo_file_name".

The "Title_object_type" shows whether the operation mode object associated with the corresponding title is a Movie object or a BD-J object.

The "Title_bdjo_file_name" shows the file name of the Movie object or the BD-J object associated with the title.

The Index.bdmv having the stated structure realizes the correspondence between the titles and the operation mode objects.

<The Structure of the BD-ROM, Part 4: XXXXX.JAR>

An XXXXX.JAR ("XXXXX" is variable, and the extension ".JAR" is fixed) is a Java™ archive file. A Java™ archive file is in the ZIP file format that is specialized for the Java™, and expand able by any commercially-available ZIP expansion software. Here, "XXXXX" is variable, and the extension ".JAR" is fixed. Such a file is herein after called a "JAR file". A JAR file includes a plurality of files in the form of directories. A single JAR file includes at least one class file, a metafile showing the attribute of the JAR file, and data such as images. Basically, a single JAR file includes a single Java™ application, and the Java™ application can be executed on the Java™ virtual machine.

Figure 2A:
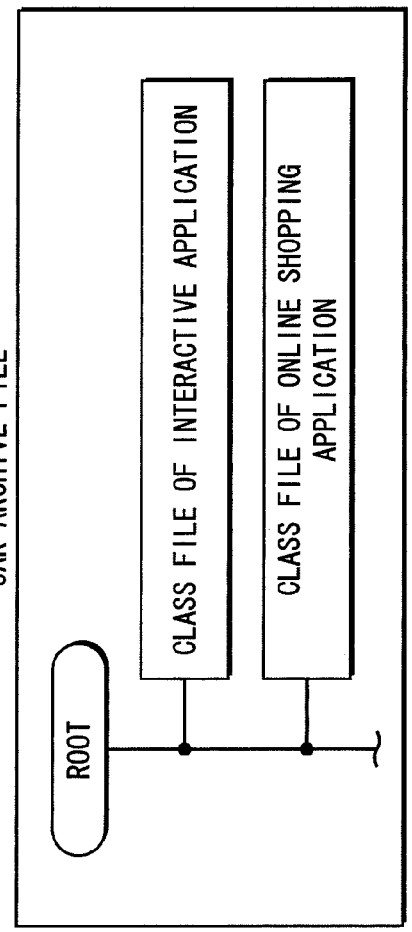
FIG. 2A shows an example file structure of the JAR file.

FIG. 2A shows an example file structure inside the JAR file. The Jar file has a structure where a "class file for an interactive application" and a "class file for an online shopping application" exist under the root directory. The Java™ applications defined by these class files are Java™ Xlets controlled via an Xlet interface. The Xlet interface has four states, namely "loaded", "paused", "active" and "destroyed". Applications mentioned in this Specification are instances of the class files recorded on a recording medium such as a BD-ROM in the stated manner.

<The Structure of the BD-ROM, Part 5: ZZZZZ.BDJO>

Figure 2B:
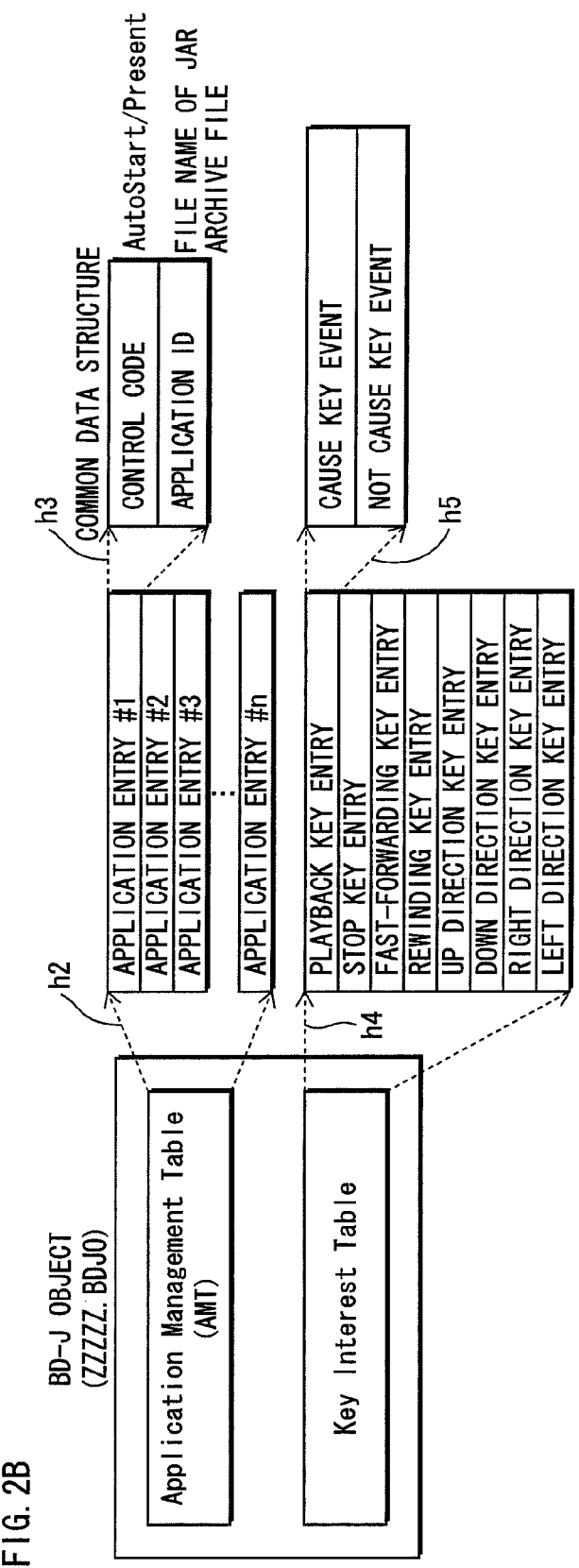
FIG. 2B shows an internal structure of a BD-J object.

A ZZZZZ.BDJO ("ZZZZZ" is variable, and the extension ". BDJO" is fixed) is a file storing the BD-J object explained above. FIG. 2B shows the internal structure of the BD-J object. As shown on the left of the FIG. 2B, the BD-J object includes an application management table and a Key Interest table.

The application management table (AMT) is a table for realizing "application signaling". The "application signaling" means to control activation and termination of the application through managing the titles on the BD-ROM as active sections of the application. Here, the "active sections" are sections on the time line of the whole content recorded on the BD-ROM, where the application can be active on the heap memory of the virtual machine. The term "active" means a state of the application, in which the application has been read into the heap memory and is executable by the virtual machine. On the other hand, sections in which the application is actually operating are called "operation sections".

The lead lines h2 in the drawing show the up-close details of the internal structure of the application management table. As the lead lines h2 show, the application management table includes a plurality of application entries #1-#n. The lead lines h3 show the up-close details of the common data structure of the application entries. As the lead lines h3 show, the application entry includes a "control code" and an "application ID". A "control code" shows how to start up the application, that is, whether to automatically start up the application in the title (Auto Start) or to start up after waiting for a call from another application (Present). An "application id" identifies an application using five-digit number as a file name of the JAR file.

The lead lines h4 show the up-close details of the structure of the Key Interest table. As the lead lines h4 show, the Key Interest table includes a playback key entry, a stop key entry, a fast-forwarding key entry, a rewinding key entry, an up direction key entry, a down direction key entry, a right direction key entry and a left direction key entry. These are entries corresponding to the keys provided on the remote control of the playback apparatus. The lead lines h5 show the up-close details of the configuration for the key entry. Specifically, whether or not to generate a key event when the corresponding key is pressed has been determined for each key.

The above are the explanations for the BD-J object.

Since the AV stream, the Index.bdmv, the JAR file and the BD-J object are recorded on the BD-ROM according to the file structure and the directory structure mentioned above, the playback apparatus can read them into the memory by making a system call for "file open".

The "file open" is processing for searching directories for a file using the file name given when the system call is made, and if the file is found, securing a FCB (File Control Block) and returning a file handle number. The FCB is generated by copying the directory entry of the target file onto the memory.

These are the explanations of the recording medium that the playback apparatus premises.

<Specifications of the GUIs of the Applications>

The following describes the applications intended for use with the playback apparatus.

As described above, the application signaling is performed in units of the titles. The title includes playback units such as the playlist information and the AV stream, and has a reasonable time length. Accordingly, the operation sections of the application can not be too short as long as the signaling is performed in units of the titles.

However, if the application is of a type that is started up after waiting for a call from another application and the call is made is just before the end of the title, the length of the operation section is likely to be short. Further, if the application is of a type that is started up after waiting for a call from another application and terminated by a call from yet another application, the length of the operation section sometimes becomes short, too.

Especially, regarding an application that is started up by another application when a particular person appears in the frame and terminated by said another application when the person goes out of the frame, the length of the operation section depends on how long the person stays within the frame. If the person stays within the frame for only a short period, the length of the operation section of the application started up by the call can be extremely short.

In the following explanation, the application that is started up by another application when a particular person appears in the frame is taken as an example for an application which might have an extremely short operation section.

Figure 3:
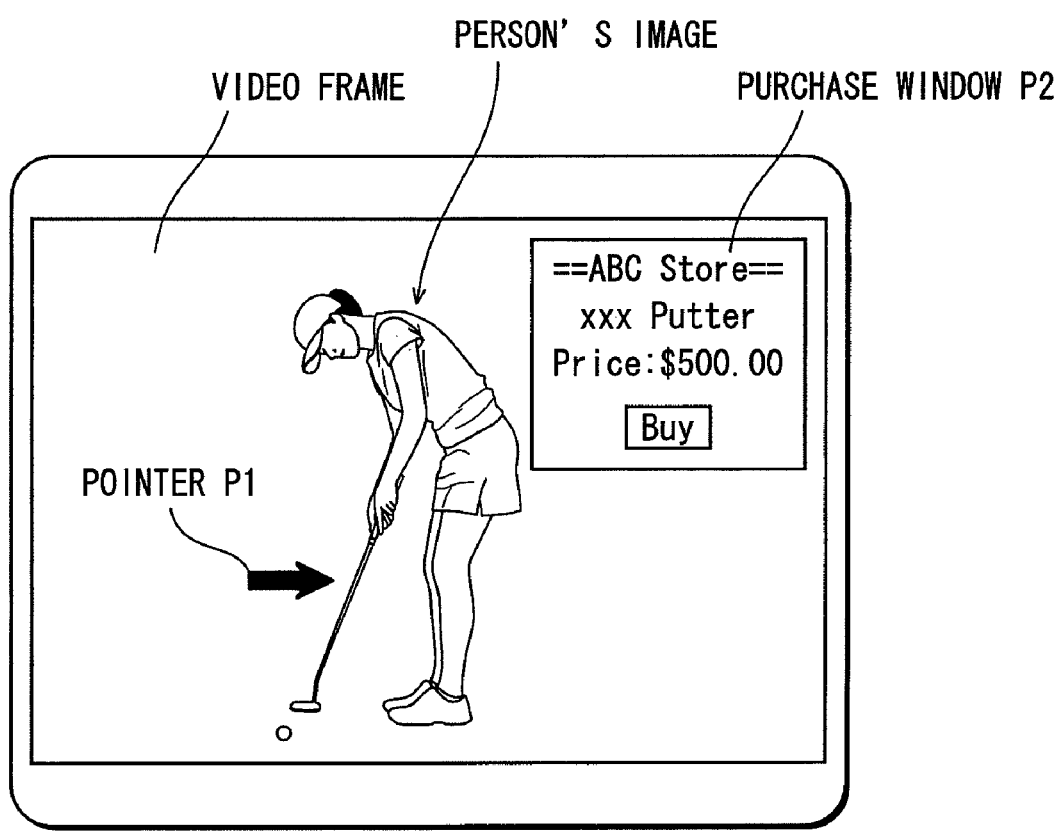
FIG. 3 shows GUIs of an interactive application and an online shopping application to be executed by a playback apparatus pertaining to the present invention.

FIG. 3 shows GUIs of an interactive application and an online shopping application, which are to be executed by the playback apparatus pertaining to this embodiment.

An "interactive application" has a video control function that enables the user to select one of selectable objects appearing in the video. This application displays a pointer p1 as the GUI. The user can move this pointer p1 by operating the direction keys of the remote control, and select a particular object (e.g. the female golfer) in the moving picture.

An "online shopping application" is used for selecting and purchasing an item appearing in the video displayed on the screen. This application displays a purchase window p2 as the GUI. The purchase window p2 includes the business owner of the online service (==ABC Store==), the title of the item (xxx Putter), the price of the item (Price: $500.00), and also includes a button GUI (BUY). This button GUI is accepts confirmation of the purchase. If the user presses the button to confirm the purchase, electronic payment will be made on the network.

<Specifications of Operations of the Applications>

Figure 4:
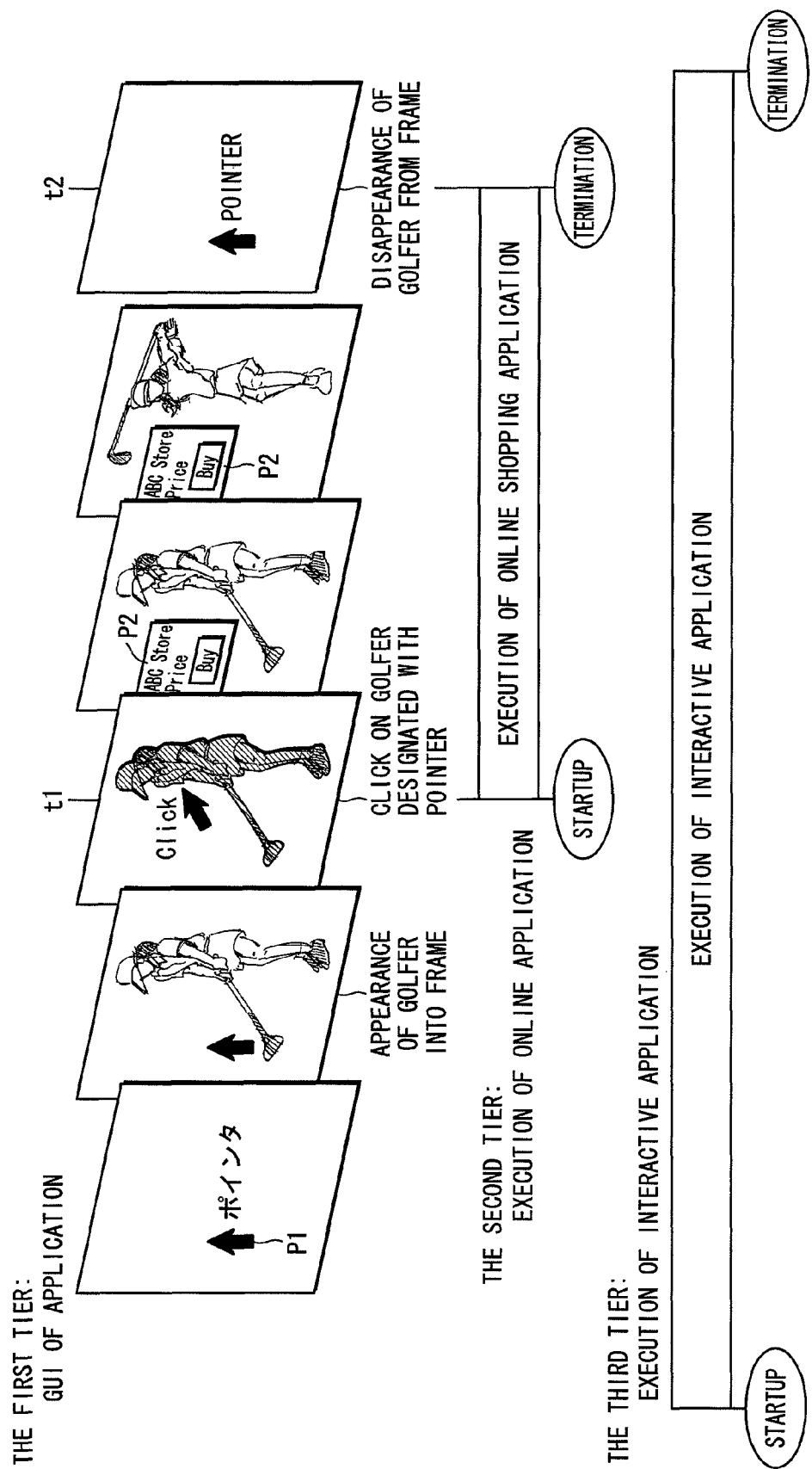
FIG. 4 shows specifications of operations performed by applications intended for use with the playback apparatus.

FIG. 4 shows specifications of operations performed by the applications intended for use with the playback apparatus. The first tier shows the GUIs of the applications, the second tier shows the period for which the online shopping application is executed, and the third tier shows the period for which the interactive application is executed.

The interactive application executes interactive processing in synchronization with the AV playback, and the operation section thereof is shown at the third tier in the drawing. Specifically, the interactive application is operating all the time while the AV playback is being executed. The interactive application can display the pointer p1, move the pointer p1 according to the user's operation, and put a focus on the person, etc., existing on the AV playback screen, according to the user's confirmation operation.

The online shopping application is associated with a person, etc. appearing on the AV playback screen, and the operation section thereof has been configured as the second tier in the drawing shows. Specifically, the online shopping application is started up when the person appears in the frame and the confirmation is made from the remote control (the timing t1 in the drawing), and terminated when the person goes out of the frame (the timing t2 in the drawing). While running, the online shopping application displays the purchase window p2, presents the details of the item related to the person to the user, and accepts the user's operation for purchasing the item.

The GUIs of the interactive application and the online shopping application are displayed as the first tier in the drawing shows. Specifically, the interactive application during operation displays the pointer p1 on the AV screen according to the user's operation.

On the other hand, the online shopping application is started up when a predetermined person (e.g. the female golfer) appears in the frame of the AV screen and the user's confirmation is made on this person. The online shopping application displays a composite screen generated by combining the person's image and the purchase window p2, presents the details of the item related to the person to the user, and accepts the user's operation for purchasing the item.

After progression of the AV playback, the online shopping application will be terminated when the person mentioned above disappears from the frame. The online shopping application according to the specifications mentioned above operates only while the associated person is being displayed on the screen. If the period for which the associated person is displayed on the AV screen is short, the period for which the online shopping application accepts the purchase of the item is very short, accordingly.

The above are the explanations for the specifications of the operations performed by the applications to be executed by the playback apparatus.

<The Playback Apparatus>

The following describes an embodiment of the playback apparatus pertaining to the present invention. The playback apparatus can be controlled from the remote control.

The remote control is a device that receives, from the user, operations that are unique to AV apparatuses, such as playback, stop, pause and skip operations, and operations to the hierarchized GUI. The remote control is provided with a playback key, a stop key, a pause key, a skip key, a menu key for calling a setup menu, direction keys for moving the focus of the GUI parts constituting the menu, an enter key for a confirmation operation onto the GUI parts constituting the menu, a cancel key for going back to an upper level of the hierarchized GUI, and numeric keys. These keys constitute a key matrix. The remote control specifies the row position and the column position of a pressed key based on a detected contact with the key matrix, and generates a key code by encoding the row position and the column position. The remote control transmits a remote control signal including the generated key code.

The remote control signal to be transmitted includes frames each having a length for a few milliseconds. The I/O bits included in the bit system of the frames includes that with a carrier signal of a few kilohertz and the without the carrier signal. The playback apparatus can receive the remote control signal by generating a clock pulse that has the same frequency and the same duty ratio as the carrier and capturing the bit system of the data part. Unlike personal computers, the playback apparatus receives instructions from the user via the remote control. Accordingly, the GUIs of the playback apparatus and the applications are specialized for operations via a remote controller.

Figure 5:
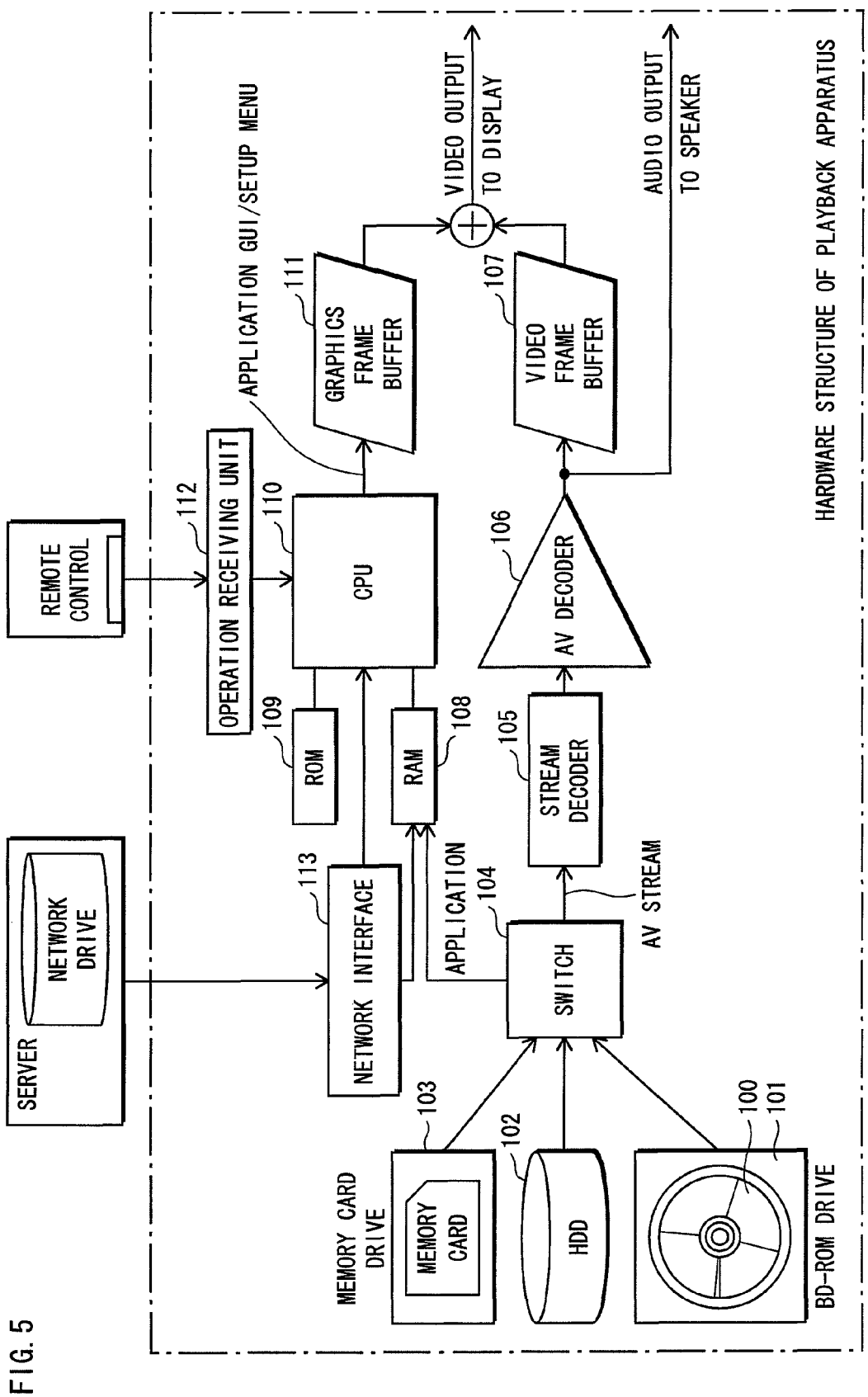
FIG. 5 shows a hardware structure of the playback apparatus.

FIG. 5 shows the hardware structure of the playback apparatus. As this drawing illustrates, the playback apparatus includes a BD-ROM drive 101, an HDD 102, a memory card drive 103, a switch 104, a stream decoder 105, an AV decoder 106, a video frame buffer 107, a RAM 108, a ROM 109, a CPU 110, a graphics frame buffer 111, an operation receiving unit 112, and a network interface 113.

<The BD-ROM Drive 101>

The BD-ROM driver 101 performs loading and ejecting of the BD-ROM having the internal structure shown in FIG. 1A, and has access to the BD-ROM.

<The HD Drive 102>

The HD drive 102 is capable of storing therein class files equivalent to the class files provided via the BD-ROM.

<The Memory Card Drive 103>

The memory card drive 103 is capable of loading a semiconductor memory card into which class files equivalent to the class files provided via the BD-ROM have been written.

<The Switch 104>

The switch 104 selectively outputs the class files and the AV stream read from the BD-ROM drive 101, the HDD 102 and the memory card drive 103 to the stream decoder 105 and the RAM 108.

<The Stream Decoder 105>

The stream decoder 105 separates the AV stream recorded on the BD-ROM 100 into the video stream and the audio stream.

<The AV Decoder 106>

The AV decoder 106 decodes the video data and the audio data separated and extracted from the stream decoded by the stream decoder 105, while keeping the synchronization between the video data and the audio data. The AV decoder 106 outputs the decoded video data to the display, and the decoded audio data to the speaker. Also, the AV decoder 106 realizes slow playback by repeating the output of each frame of the video data a predetermined number of times. For example, if the AV decoder 106 has been instructed to perform the playback at the ½ speed of the normal playback and received video data corresponding to the first frame, video data corresponding to the second frame, . . . and video data corresponding to the fifteenth frame, the AV decoder 106 outputs each piece of video data in duplicate. Specifically, the AV decoder 106 outputs, in a second, video data corresponding to the first frame, video data corresponding to the first frame, video data corresponding to the second frame, video data corresponding to the second frame, video data corresponding to the fifteenth frame, and video data corresponding to the fifteenth frame. Since the AV decoder 106 outputs two pieces of video data of the same frame, the playback of the AV stream requires a time that is twice as long as the normal playback. As a result, the playback apparatus can realize the slow playback that is at the ½ speed of the normal playback.

The video frame buffer 107 stores therein non-compressed frame images obtained through the decoding by the AV decoder 106. In this embodiment, it is assumed that the update frequency of the video frame buffer in a second is thirty times per second. This means that the AV decoder 106 outputs thirty frames of the AV stream in a second to the video frame buffer 107, and thirty frames of the graphics rendered by the application are output to the graphics frame buffer 111 in a second.

According to this assumption, in the case of the normal playback, it is necessary to control the stream decoder 105 so as to decode thirty frames of the AV stream in a second and separate and the decoded AV stream into the video data and the audio data.

<The RAM 108>

The RAM 108 stores therein data necessary for the CPU 110 to perform data processing.

<The ROM 109 for the Built-in Programs>

The ROM 109 stores therein programs that have been built in the playback apparatus, such as an interpreter, a native library, and a class library.

<The CPU 110>

The CPU 110 executes a native code stored in the ROM 109 for the built-in programs.

<The Graphic Frame Buffer 111>

The graphic frame buffer 111 is used for rendering the GUI when the CPU 110 performs interactive control. The graphics rendering realized by the graphic frame buffer 111 is, for example, the GUI display by the applications, the menu display at the setup, and so on. The graphic rendered by the applications, such as the purchase window p2 and the pointer 1, are rendered through operations by the graphic frame buffer 111, because they are kinds of GUIs. The graphics on the graphics frame buffer 111 are managed with use of numeric values for graphics management. The graphics data image corresponding to each numeric value is displayed on the screen for a predetermined period. On the other hand, the applications generate new graphics during this period. After the predetermined period, the data stored in the graphic frame buffer 111 will be overwritten with newly generated graphics data. The numeric values for the graphics management are updated according to the overwriting. That is, the GUI display by the applications changes as the frames of the AV playback progress, based on repetition of the series of operations, namely "the generation of the graphics by the applications", "the updating of the generated graphics", "the overwriting of the graphics" and "the updating of the numeric values for the graphics management". Moreover, it is possible to change the update frequency of the data in the graphics buffer 111 within a unit time (e.g. a second) by changing the number of times the series of operations are repeated within the unit time (the number of times is herein after referred to as the execution speed of the applications). Accordingly, it is possible to increase or decrease the responsivity of the graphics data display (GUI display) by the applications on reception of the input. Since the data in the graphics frame buffer 111 is output to the display after being combined with the data in the video frame buffer 107, the display shows graphics images corresponding to the data written in the graphics frame buffer 111 overlaid with the playback images corresponding to the AV stream written in the video frame buffer 107.

<The Operation Receiving Unit 112>

The operation receiving unit 112 detects and notifies user's operations performed on the input devices such as the remote control and the front panel of the playback apparatus. This notification is made by generating a UOP according to an interruption caused by an interruption handler included in the device driver corresponding to each input device. A UOP (UOP event) is an event that occurs when a pressed key is detected based on the key matrix provided on the remote control and front panel, and includes a key code corresponding to the pressed key. Specifically, the interruption handler included in the device driver corresponding to the remote control and the front panel generates a UOP event by generating an interruption signal based on a pressed key when a pressed key is detected based on the contact with the key matrix.

<The Network Interface 113>

The network interface 113 executes a protocol stack for network connection, and has the playback apparatus realize, as network drives, drives of server computers on the network. As a result, the playback apparatus can download data from the network drive, and upload data to the network drive. The playback apparatus can perform data communications with external servers via the network interface 113. Therefore, in the case of executing the online shopping application, the playback apparatus can realize the electronic payment with payment servers on the network according to the byte codes constituting the application, via the network interface 113.

The above are the explanations for the hardware structure of the playback apparatus. The following explains the software structure that premises the stated hardware structure The playback apparatus of FIG. 5 is a Java™ platform structured by a full implementation of the Java™ 2 Micro Edition (J2ME) Personal Basis Profile (PBP 1.0) and the Globally Executable MHP specification (GEM1.0.2) for package media targets. The playback apparatus has a layer model that is illustrated in FIG. 6.

Figure 6:
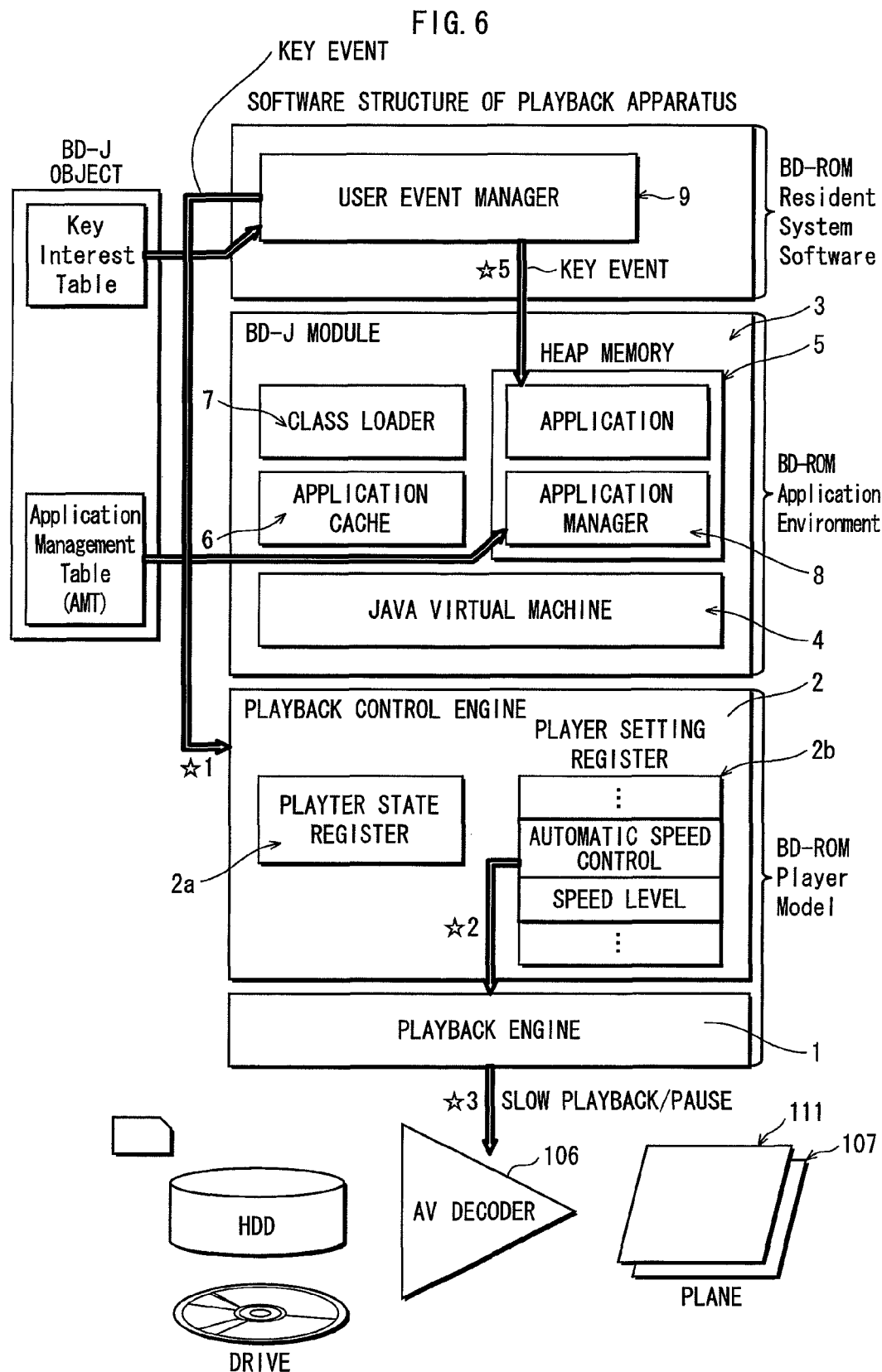
FIG. 6 shows a layer model of a software structure of the playback apparatus.

FIG. 6 shows the layer model of the soft ware structure of the playback apparatus. This layer model mainly includes the following three layers:

i) BD-ROM Resident System Software

This is a layer of software incorporated into the BD-ROM playback apparatus and operates as the resident software. The BD-ROM Resident System Software includes a user event manager 9.

ii) BD-J Application Environment

This layer is referred to as a BD-J module 3, and works as the execution environment for the applications. This corresponds to the Java platform (referred to as the BD-J module).

iii) BD-ROM Player Model

This is a layer of software that realizes functions as a BD-ROM player, and includes a playback engine 1 and a playback control engine 2.

<The Playback Engine 1>

The playback engine 1 performs the AV playback functions. The AV playback functions of the playback apparatus are conventional functions that follow those of DVD players, CD players, and so on. The AV playback functions include, for example, functions of starting the playback (Play), stopping the playback (Stop), pausing the playback (Pause On), canceling the pausing (Pause Off), canceling the Still function (Still off), forwarding with speed designation (Forward Play (speed)), rewinding with speed designation (Backward Play (speed)), switching the audio (Audio Change), switching the subtitles (Subtitle Change), and switching the angle (Angle Change).

<The Playback Control Engine 2>

The playback control engine 2 performs functions such as (i) playback of the playlist and (ii) acquisition/setting of the playback state. The function of playing back the playlist is one of the AV playback functions, and performed to start or stop the playback according to the playlist. The playback control engine 2 also includes a player state register 2a that shows the state of the playback apparatus, and a player setting register 2b that shows the setting of the playback apparatus by the manufacture and the user. The playback control engine 2 performs the function of acquiring/setting the playback state of the playback apparatus, according to player state information included in the player state register 2a and player setting information included in the player setting register 2b. Characteristically, the player setting register 2b includes setup items of "automatic speed control" and "speed level", and if the automatic speed control in the player setting register 2b is ON, the playback at the speed level in the player setting register 2b will be realized.

<The BD-J Module 3>

The BD-J module 3 is the platform of the playback apparatus, and includes a Java™ virtual machine 4, a heap memory 5, an application cache 6, a class loader 7 and an application manager 8.

The Java™ virtual machine 4 is an interpreter. The Java ™) virtual machine 4 converts byte codes, constituting an application stored in the heap memory 5, into native codes that the CPU 110 can interpret, and provides the CPU 110 with the native codes. As a result, it is possible to have the CPU 110 execute the application as the byte codes.

<The Heap Memory 5>

The heap memory 5 is a memory for storing therein applications as byte codes, which are instances of the class files.

<The Application Cache 6>

The application cache 6 is a cache memory for storing therein applications.

<The Class Loader 7>

The class loader 7 reads the class files of the applications from the BD-ROM 100 and converts the class files into byte codes. The byte codes obtained in this way will be stored into the heap memory 5. Accordingly, the heap memory 5 stores the applications as the byte codes, and these byte codes will be executed by the Java ™) virtual machine 4.

<The Application Manager 8>

When the titles to be played back by the playback apparatus is switched from one to another, the application manager 8 reads the application programs from the BD-ROM 100 and stores the programs into the application cache 6. Then, the application manager 8 refers to the control code of each application. If the control code is AutoStart (automatic startup), the application manager 8 causes the Java™ virtual machine 44 to execute the application to be automatically started up. The application manager performs this conversion by outputs an instruction to the class loader 7.

Among the applications mentioned above, the interactive application is to be automatically started up at the AV playback. Therefore, the interactive application is automatically started up in the manner stated above.

On the other hand, application programs that are started up according to a call from another application or a startup request from the user wait for such a call in the state of being cached in the application cache 6. The online shopping application mentioned above is an application that is to be started up according to a startup request from the user or a call from another application. Therefore, if a direction key of the remote control is pressed when the online shopping application is in the state of being cached in the application cache 6 and waiting for the startup request from the user and a call from another application, the online shopping application will be converted into executable codes and stored into the heap memory 5. The Java™ virtual machine 4 executes the application programs by interrupting and executing the codes stored in the heap memory 5.

<The User Event Manager 9>

When a UOP event occurs, the user event manager 9 judges whether to generate a key event (an event that the applications can receive) corresponding to the UOP event. In the case of judging that it is necessary to generate a key event, the user event manager 9 outputs a key event to the applications. Since the key Interest table of the BD-J object defines whether to generate a key event for each key, the user event manager 9 makes the judgment with reference to the entries included in the Key Interest table of the BD-J object. Each of the arrows ☆1, 2, 3 and 5 schematically shows a characteristic processing flow in this layer model. As mentioned above, an occurrence of a key event and output of the key event to an application are made when an UOP event occurs (☆5). Characteristic processing of the user event manager 9 is that the user event manger 9 outputs the occurred key event to the playback control engine 2 (☆2) before outputting the key event. Upon the output of the key event, the playback control is performed based on the automatic speed control and the speed level stored in the player setting register 2b. As a result of this playback control, the slow playback and the pause of the playback can be realized. The above are the explanations for the layer model of the software in the playback apparatus.

In the above explanations of the layer model, it is stated as being characteristic that the playback control is performed based on the automatic speed control and the speed level, upon the output of the key event. The following explains how this characteristic feature improves the operations of the applications.

The software elements shown in this drawing operate as follows. Since the interactive application is an element for controlling the video that is being played back and soon by selecting a one of selectable objects, the pointer p1 appears on the AV screen. When the user presses a direction key of the remote control to select an item that the user wants to buy according to the pointer p1 and moves the cursor onto the item and presses the enter key of the remote control, the class loader 7 converts the online shopping application programs stored in the application cache 6 into executable byte codes, and stores the byte codes into the heap memory 5. As the Java™ virtual machine 4 executes the codes stored in the heap memory 5, the online shopping application program stars up, the purchase window p2 appears on the display. From this window, the user can purchase the item through a prescribed procedure.

Here, during the execution of the online shopping application, if the automatic speed control is ON, the AV playback is controlled such that the playback speed will be the prescribed speed level. The AV stream will be played at a slow speed or paused while the user is operating the interactive application program. However, a predetermined period (e.g. thirty seconds) after the user stops operating the interactive application, or when the user requests the normal playback, the playback speed returns to the normal.

Even while the AV stream is being played at the slow speed, the Java™ virtual machine 4 does not operate slowly in synchronization with the slow playback of the AV stream (In other words, the number of times in the unit time (i.e. the execution speed) of repeating the series of operations, namely "the generation of the graphics by the applications", "the updating of the generated graphics", "the overwriting of the graphics" and "the updating of the numeric values for the graphics management" does not change according to the playback speed of the AV stream). In this embodiment, even while the AV stream is being played at the slow speed, the applications are executed at the speed (normal speed) that is the same as the speed in the case where the AV stream is being played at the normal speed. If the execution speed of the application is decreased according to the slow playback speed of the AV stream, the responsivity is decreased, which is inconvenient for the user. The slow operation in synchronization with the AV playback is avoided to increase the responsivity of the interactive application program upon receipt of inputs.

On the other hand, the signaling is performed on the applications by the application manager 8 in units of titles, based on the application management table. Even if the Java™ virtual machine 4 is operating at the normal speed, if the AV playback is performed at a low speed, the period for which the playback of each title continues is increased accordingly. As a result, the applications continue their operations at the normal speeds. Therefore, it is possible to increase the lengths of the operation sections of the applications while keeping the normal responsivity.

FIG. 7 schematically shows the improvement of the specifications of the operations performed by the applications. The first tier shows a plurality of frame images used for the AV playback performed by the playback apparatus. The second tier shows the operation sections of the interactive application and the online shopping application. The third tier shows the GUI display performed by the online shopping application.

When a key event, showing that the person's image has been selected, occurs according to the user's operation, if the automatic speed control of the player setting register 2b is ON, the slow playback will be performed according to this configuration. In the slow playback, each frame is displayed twice or more times. Accordingly, the period for which the person is displayed becomes twice or four times as long as the original, for example. As a result, the length of the operation sections, which has been activated by the user's operation on the person's image, becomes twice or four times as long as the original, for example.

As the length of the operation section becomes longer, the user has an enough time for operating the GUI displayed by the online shopping application. As described above, if the automatic speed control is ON, the playback of the AV data is controlled to be performed at the speed level predetermined by the user. Therefore, the operation section of the online shopping application associated with a specific person's image becomes longer, and the user can easily operate the GUI displayed by the online shopping application. This is the improvement of the specifications of the operations of the applications, which is provided by the characteristic feature of the playback apparatus.

The playback apparatus has a function mode in which the specifications of the operations of the applications are improved. This mode, which improves the operability for the user by extending the operation sections of the application by controlling the AV playback speed so as to be slow or to be paused, is called "application EASY mode".

Since this application EASY mode is provided, the player state register 2a in the playback apparatus accepts configurations of the application EASY mode.

Firstly, as a general structure of the playback control engine, the player state information stored in the player state register 2a is described next.

<The Player State Register 2a>

Figure 8A:
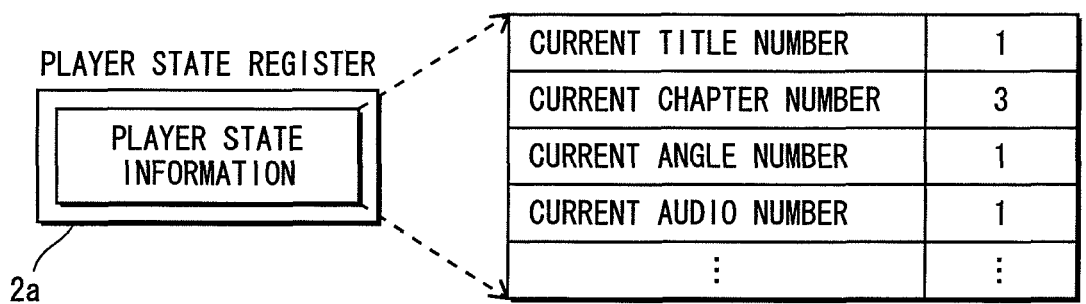

The player state register 2a is used for showing the playback state of the contents on the playback apparatus, and the information stored therein dynamically changes according to the playback state of the content recorded on the BD-ROM 100. Here, the playback state of the content is specified based on parameters, such as a current title number, a current chapter number, a current angle number, and a current audio number. FIG. 8A shows the internal structure of the player state information stored in the player state register 2a. The player state information stored in the player state register 2a includes a "current title number", a "current chapter number", a "current angle number", and a "current audio number".

The "current title number" shows the title that is currently being played, using a valid title number (that is equal to or more than 1). If no title is currently being played, the current title number shows an invalid value (e.g. 0).

The "current chapter number" shows the chapter that is currently being played, using a valid chapter number (that is equal to or more than 1). The chapters are defined within the title that is indicated by the current title number. If no chapter is currently being played, the current chapter number shows an invalid value (e.g. 0).

The "current angle number" shows a video angle that is currently being selected, using a valid angle number (that is equal to or more than 1). If no video is currently being played, the current angle number shows an invalid value (e.g. 0).

The "current audio number" shows, in the same manner as the current angle number, audio that is currently being selected, using a valid audio number (that is equal to or more than 1). If no video is currently being played, the current audio number shows an invalid value (e.g. 0).

<The Player Setting Register 2b>

Figure 8B:
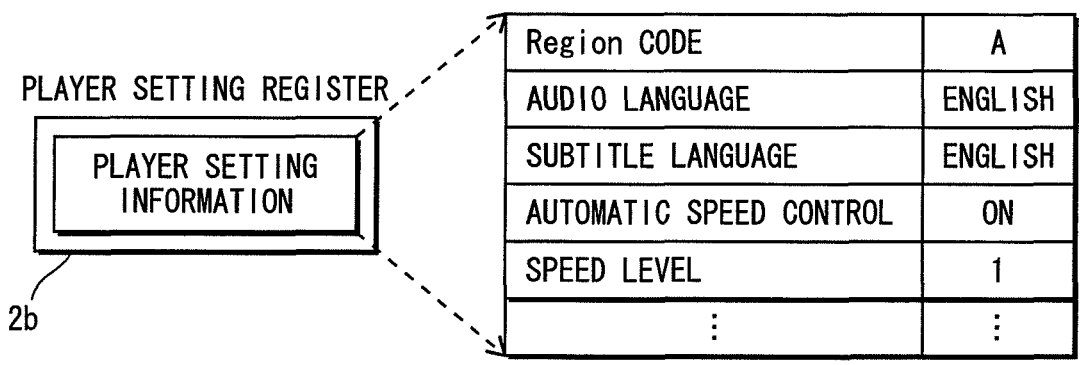
FIG. 8B shows an internal structure of player setting information.

Next, the following describes the information (player setting information) stored in the player setting register 2b. The player setting information does not dynamically change according to the playback state. Instead, the player setting information has been prestored to show the user's intention about how the content on the BD-ROM 100 should be played back. Some elements included in the player setting information can be changed according to the user's input. FIG. 8B shows the internal structure of the player setting information. As this drawing shows, the player setting information includes a "Region code", an "audio language", a "subtitle language", an "automatic speed control", and a "speed level".

The "Region code" shows the region where it is allowed to sell or use the playback apparatus. The "Region code" cannot be changed by the user.

The "audio language" shows the default configuration of the audio language.

The "subtitle language" shows the default configuration of the subtitle language. These two information elements stored in the player setting register 2b is also provided for general BD-ROM playback apparatuses. The following two information elements are newly introduced into the playback apparatus.

The "automatic speed control" is information showing whether or not it is allowed to change the playback speed of the AV stream when an "input relating to operations of the application", which has been defined such that the application becomes executable, is made by the user. The "input relating to operations of the application" is, for example, a key-in of the cursor and the ENTER key for starting up the application. In particular, if the application is for selecting one of persons and objects displayed on the screen, the automatic speed control is started in conjunction with the movement of the person and the object.

The "speed level" is information showing the speed of the playback of the AV stream to be controlled when the automatic control is permitted (set to be ON) by the "automatic speed control". In this embodiment, the automatic speed control shows ON (permitted)/OFF (not permitted) and the speed level shows any of six levels, namely 0-5.

Since the player setting register 2b is improved for introduction of the application EASY mode, the playback apparatus can accept setting of the application EASY mode when displaying the setup menu.

Figure 9:
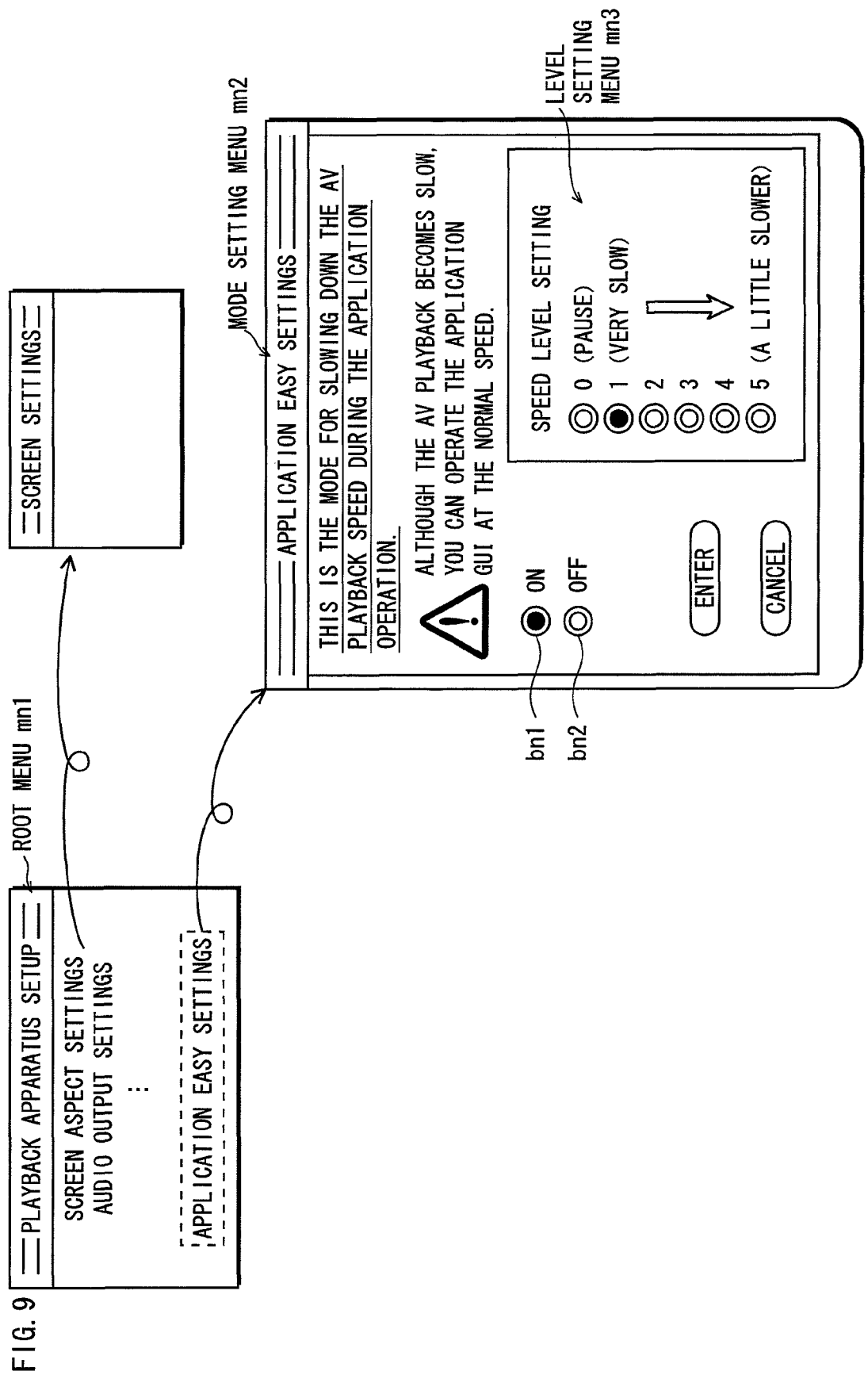
FIG. 9 shows a setup menu of the playback apparatus.

FIG. 9 shows the setup menu of the playback apparatus. In this drawing, the root menu mn1 is at the highest level of the hierarchical structure, and general setting items for the playback apparatus, such as screen aspect settings and the audio output settings are listed here. The characteristic point of this embodiment is that these setting items include the setting item for the application EASY mode. The mode setting menu mn2 shown in the drawing is displayed when the application EASY mode is selected.

The mode setting menu mn2 for the application EASY mode includes an explanation of this mode and two button members bn1 and bn2 for receiving a selection between "ON" and "OFF". When "ON" is selected, the level setting menu mn3 is popped up.

The level setting menu mn3 includes six button members corresponding to the speeds from "0" to "5" respectively. It is possible to set the speed level in the player setting register 2b by selecting one of these levels.

Regarding applications that can be operated while a particular person is being displayed in the frame, the user can set the speed level in the application EASY mode to be "1 (very slow)" or "0 (pause)" to extend the period for which the particular person is displayed, such that the user can easily operate the GUI of the application.

The above are the explanations for the improvement of the GUI of the playback apparatus for setting the application EASY mode. Next, a specific software structure for realizing the characteristic feature of the playback apparatus is described.

Figure 10:
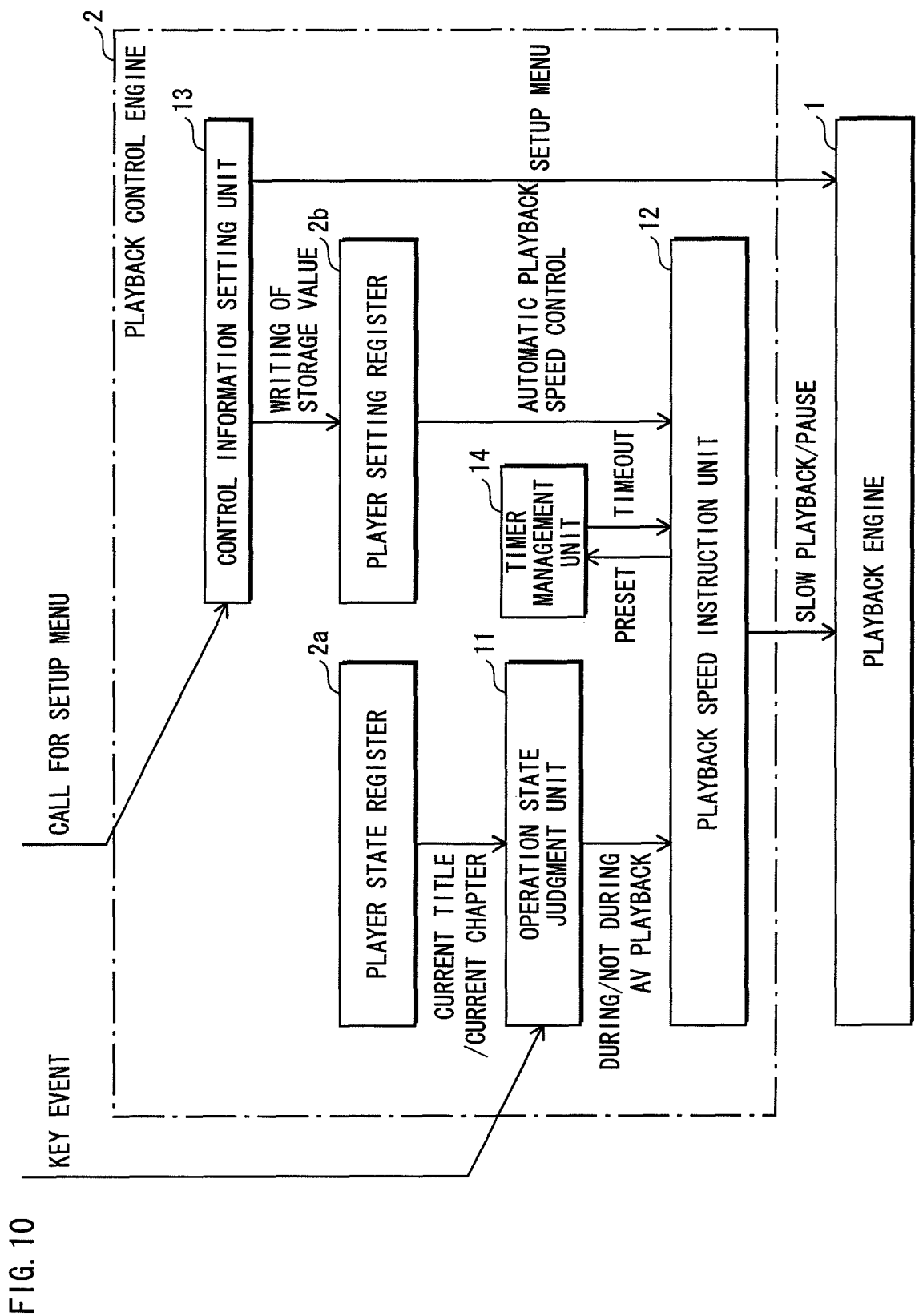
FIG. 10 shows functional components of a playback control engine 2.

To realize the application EASY mode, the playback control engine 2 of the playback apparatus includes functional elements that are shown in FIG. 10. FIG. 10 shows the functional elements included in the playback control engine 2. As this drawing shows, the playback control engine 2 includes an operation state judgment unit 11, a playback speed instruction unit 12, a control information setting unit 13, and a timer management unit 14.

<The Operation State Judgment Unit 11>

The operation state judgment unit 11 judges, when a key event occurs, whether or not the playback apparatus is in the state of playing back the AV stream, and whether or not the key event is a key event for operating the application. If the playback apparatus is in the state of playing back the AV stream, and the key event is for operating the application, the operation state judgment unit 11 notifies the playback speed instruction unit 12 of the received key event.

The operation state judgment unit 11 makes the judgment as to whether or not the playback apparatus is in the state of playing back the AV stream by judging whether or not the current title number stored in the player state register 2a is a valid title number. If the title number stored in the player state register 2a is valid, the operation state judgment unit 11 judges that the content recorded on the BD-ROM 100 is currently being played. On the other hand, if the title number stored in the player state register 2b is invalid, the operation state judgment unit 11 judges that the content is currently not being played.

Here, the key event for operating the application is a key event that has been defined in the key Interest table as a key event that is to be received by an application and executable by the application in the title. If the key event received from the operation receiving unit 112 is a key event that has been defined in the key Interest table, the operation state judgment unit 11 judges that the received key event is the key event for operating the application.

<The Playback Speed Instruction Unit 12>

When the graphics frame buffer 111 receives the notification of the key event, the playback speed instruction unit 12 refers to the information that has been set in the player setting register 2b, and controls the playback engine 1 so as to perform the AV playback at the speed level set in the player setting register 2b. Here, the case of decreasing the playback speed to the half of the normal speed is taken as an example for explanation. In this case, the playback speed instruction unit 12 controls the stream decoder 105 so as to separate and extract fifteen frames of the AV data from among thirty frames of the AV data displayed in a second. Also, the playback speed instruction unit 12 instructs the timer management unit 14 to start the time measurement using the timer.

<The Control Information Setting Unit 13>

The control information setting unit 13 stores information about the ON/OFF of the automatic control function of the playback speed of the AV stream and the playback speed after the automatic control into the player setting register 2b. For example, the user presses the menu key of the remote control and selects the mode setting menu mn2 for setting the application EASY mode in the sate where the playback apparatus is not playing the AV stream, the control information setting unit 13 displays the mode setting menu mn2 for setting the application EASY mode of FIG. 9. Assume that in the state where the mode setting menu mn2 is displayed, the user operates the direction key of the remote control, selects the "ON" of the automatic speed control in the mode setting menu mn2 and selects "1" as the speed level in the level setting menu mn3. When the user presses the ENTER key of the remote control, the control information setting unit 13 reads the information which has been set in the mode setting menu mn2 ("ON" in this example) and the speed level which has been set in the level setting menu (the speed level "1" in this example). As a result, the automatic speed control of the player setting information stored in the player setting register 2b is set to be "ON", and the automatic control of the AV stream will be permitted. Also, the speed level in the player setting register 2b is set to be "1".

<The Timer Management Unit 14>

The timer management unit 14 controls the timer included in the playback apparatus. When the operation receiving unit 112 receives an operation of the application from the user, the timer management unit 14 starts the time measuring using this timer. When the timer completes counting of a prescribed time (e.g. 30 seconds), the timer management unit 14 makes notification of the time out. Specifically, upon receipt of a message that instructs to start the time measurement by the timer from the playback speed instruction unit 12, the timer management unit 14 starts the time measurement using the timer, and after a prescribed time (30 seconds in this example), outputs a time out message to the playback speed instruction unit 14.

If the timer management unit 14 receives a message to instruct to start the time measurement again, within a predetermined time (30 seconds in this example) after receiving the instruction to start the time measurement, the time management unit 14 resets the timer to restart the measurement. As described above, since the timer management unit 4 receives the message for instructing to start the time measurement using the timer again within the predetermined period, it can be assumed that the user is continuously operating the application. Therefore, it is possible to more certainly prevent the user from missing an opportunity to operate the application if the timer is reset at this timing.

In view of the implementation of the speed control of the AV playback, a standard player model of the apparatus that executes the BD-J application shown in FIG. 6 includes a module (the user event manager 9) that judges whether to output a user event, occurred due to user's any operation, to the application, and outputs a key event to the application in the case of judging affirmatively.

Figure 11:
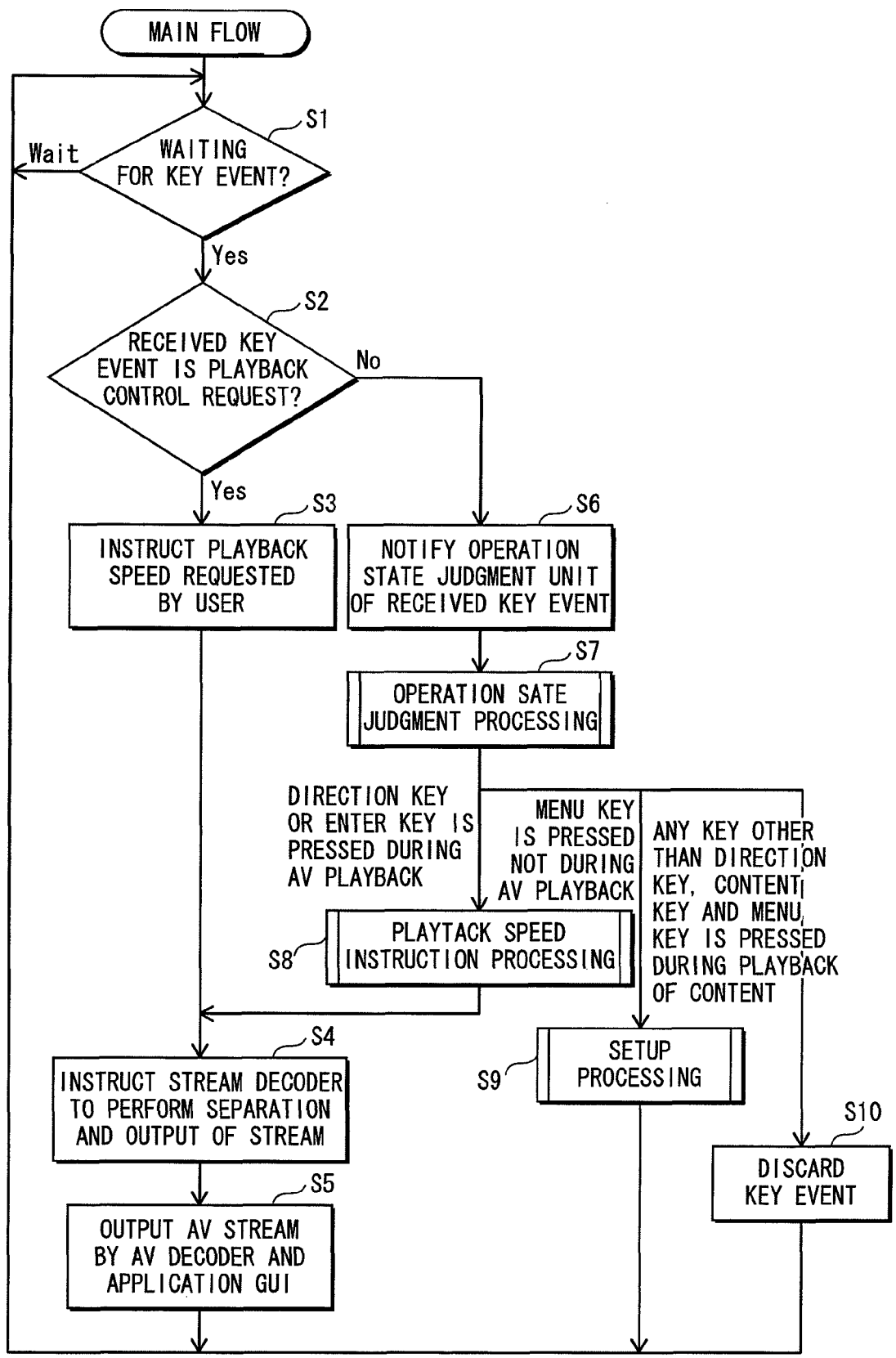
FIG. 11 is a flowchart showing processing procedures as a main routine of the playback control engine 2.

The functional elements can be implemented by having the CPU execute the processing procedures shown in the flowcharts of FIG. 11 to FIG. 14 written in a computer description language. The following explains the processing procedures for realizing the functional elements, with reference to the flowchart. FIG. 11 is a flowchart showing a processing procedure as the main routine for the playback control engine 2.

At Step S1, the operation receiving unit 112 is in the state of waiting for an operation input by the user from the remote control. If the operation receiving unit 112 receives the input, the result of the judgment at Step S1 is Yes, and the processing moves to Step S2. Step S2 is for judging whether or not the received operation input is a playback control request (playback, pause, and so on). If judged as Yes at Step S2, an instruction is provided to perform the playback at the playback speed requested by the user (Step 3). In other words, the stream decoder 105 is instructed to decode the input stream to separate it into video data and audio data, and to output the video data and the audio data to the AV decoder 106 (Step S4)

The class files read from the BD-ROM are converted into the executable codes, and stored in the heap memory 5. The Java™ virtual machine 4 starts up the application program stored in the heap memory 5, interprets and executes the executable codes, and generates and outputs graphics images if necessary. The AV decoder 106 decodes the video data included in the AV stream in synchronization with the audio data, outputs the decoded audio to the speaker and outputs the decoded video to the display (Step S5). Then, the processing returns to Step 1 for waiting for an input.

If judged as No at Step 2, the operation state judgment unit 11 is notified of the received key event (Step S6), and instructed to perform operation state judgment processing (Step S7). The processing branches according to the result of this processing. This operation state judgment processing is performed for judging whether or not the AV stream is currently being played and whether or not the received key event is for operating an application and executable while a title is being played. If the playback apparatus is in the state of playing an AV stream, and the pressed key is the direction key or the ENTER key, playback speed instruction processing (Step S8) is executed, and the processing moves to Step S4.

If the playback apparatus is in the state of not playing an AV stream, and the pressed key is a menu key for calling the setup menu, setup menu processing (Step S9) is executed and the processing returns to Step 1 for waiting for an input. Even if the playback apparatus is in the state of playing an AV stream, if the received key event does not relate to operations of the application nor the menu key, the key event is discarded (Step S10) and the processing returns to Step 1 for waiting for an input.

Figure 12:
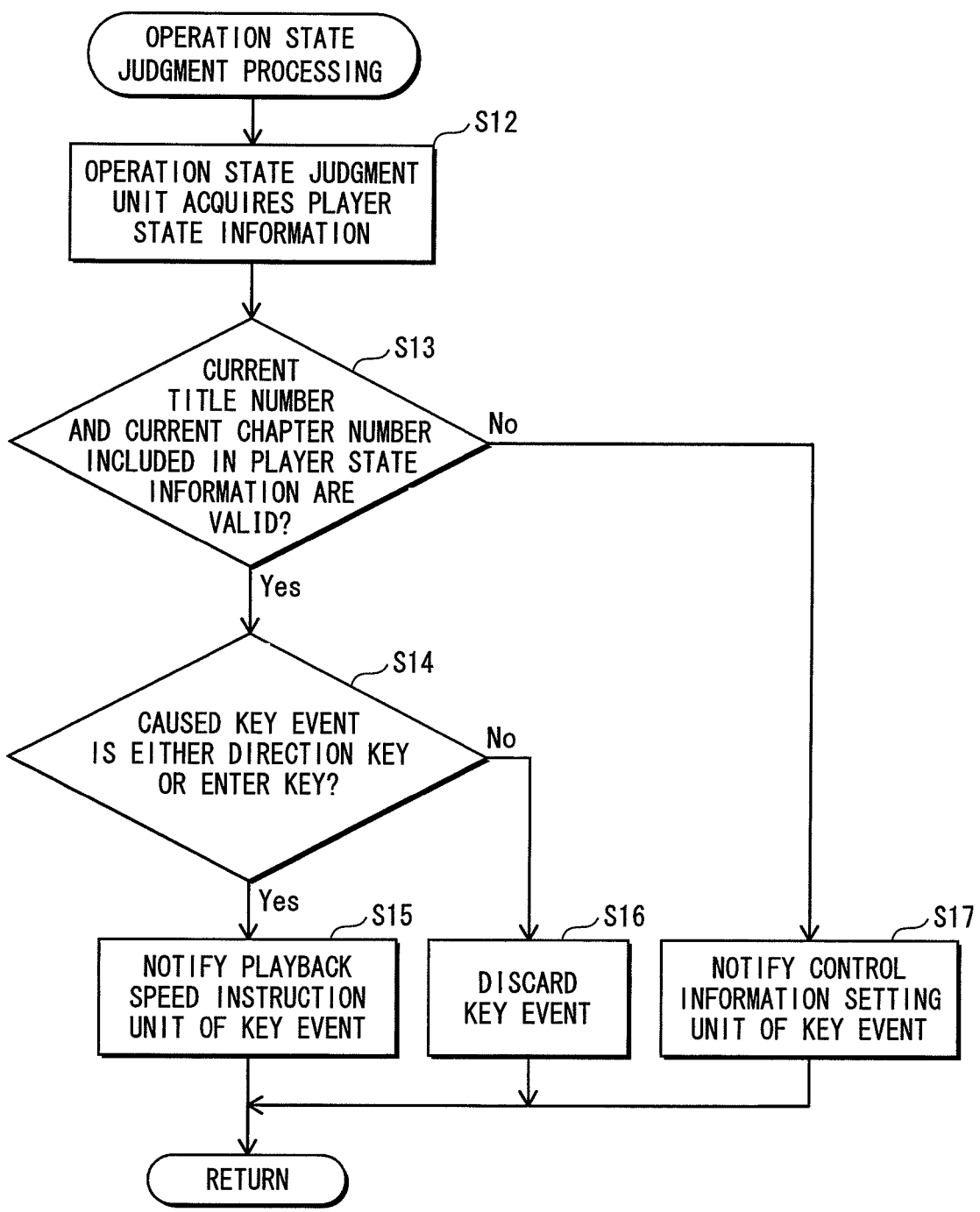
FIG. 12 is a flowchart showing processing procedures of operation state judgment processing.

FIG. 12 is a flowchart showing the operation state judgment processing. Upon receipt of a key event corresponding to an operation input, the operation state judgment unit 11 reads the player state information from the player state register 2a at Step S12, and judges whether the current title number and the current chapter number included in the player state information are valid or invalid at Step 13.

If the current title number is valid, the processing moves from Step 13 to Step 14.

Step S14 is a judging step for judging whether the received key event is a key relating to an operation of the application (e.g. the direction key and the ENTER key). If judged as Yes at this step, the key event is notified to the playback speed instruction unit 12 (Step S15), and the processing returns to the main flowchart. If judged at Step 14 that the received key event is not a key relating to an operation of the application, the received key event is discarded (Step S16), and the processing returns to the main flowchart.

At Step S13, if the current title number and the current chapter number are invalid, the key event received from the operation receiving unit 112 is notified to the control information setting unit 13 (Step S17), and the processing returns to the main flowchart.

Figure 13:
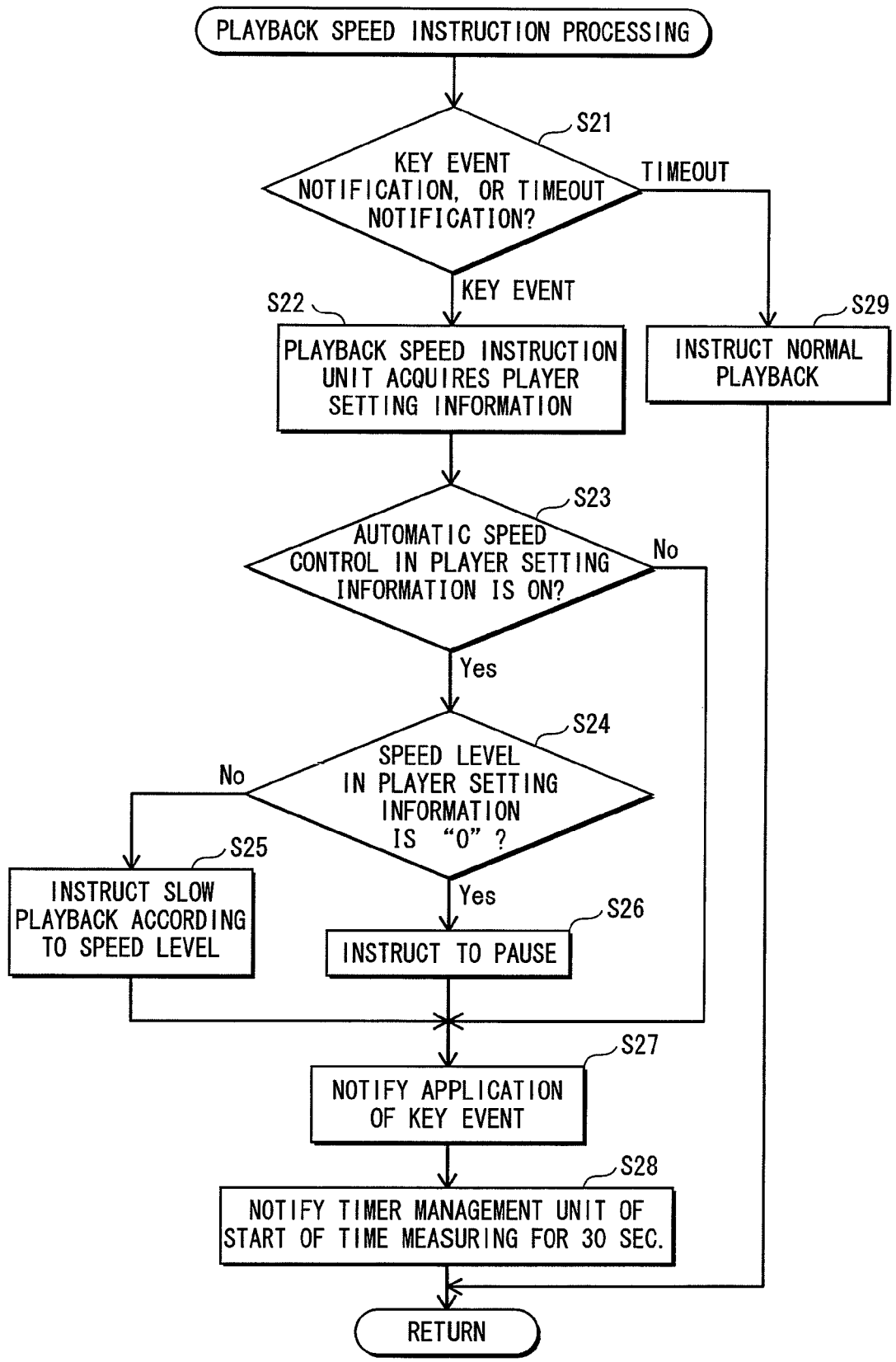
FIG. 13 is a flowchart showing processing procedures of playback speed instruction processing.

FIG. 13 is a flowchart showing the processing procedures of the playback speed instruction processing.

Step 21 is for judging whether the message received from the operation state judgment unit 11 is a key event notification or a timeout notification.

If the massage received from the operation state judgment unit 11 is a key event notification, the playback control engine 2 acquires the player setting information (Step S22), and the processing moves to Step S23. Step 23 is for judging whether or not the player setting information stored in the player setting register 2b permits the automatic speed control (i.e. ON or OFF). If Step S23 is Yes, Step S24 to Step S26 will be executed. If the automatic speed control is not permitted (OFF) and Step S23 is No, Step S24 to Step S26 will be skipped.

Step S24 is for judging whether the speed level defined in the player setting information is 0 or not. If judged as Yes, the playback control engine 2 instructs the playback speed instruction unit 12 to pause the playback (Step S26). If judged as No, the playback control engine 2 instructs the playback speed instruction unit 12 to perform the playback at a speed corresponding to the speed level (i.e. slow playback) (Step S27).

For example, the speed level can be adjusted in five levels by defining the speed level "1" as a speed much slower than the normal playback, and the speed level "5" as a speed a little slower than the normal playback.

After the processing procedures above, a message for instructing to start the time measurement using the timer is notified to the timer management unit 14 (Step S28), and the processing returns to the main routine.

Next, the case of receiving the timeout notification at Step S21 is described. This timeout notification shows that a predetermined period (30 seconds in this example) has elapsed since the last key input from the timer management unit 14. If the received message is a timeout notification from the timer management unit 14, the playback engine 1 is instructed to perform the normal playback (Step S29), and the processing returns to the main routine.

Figure 14:
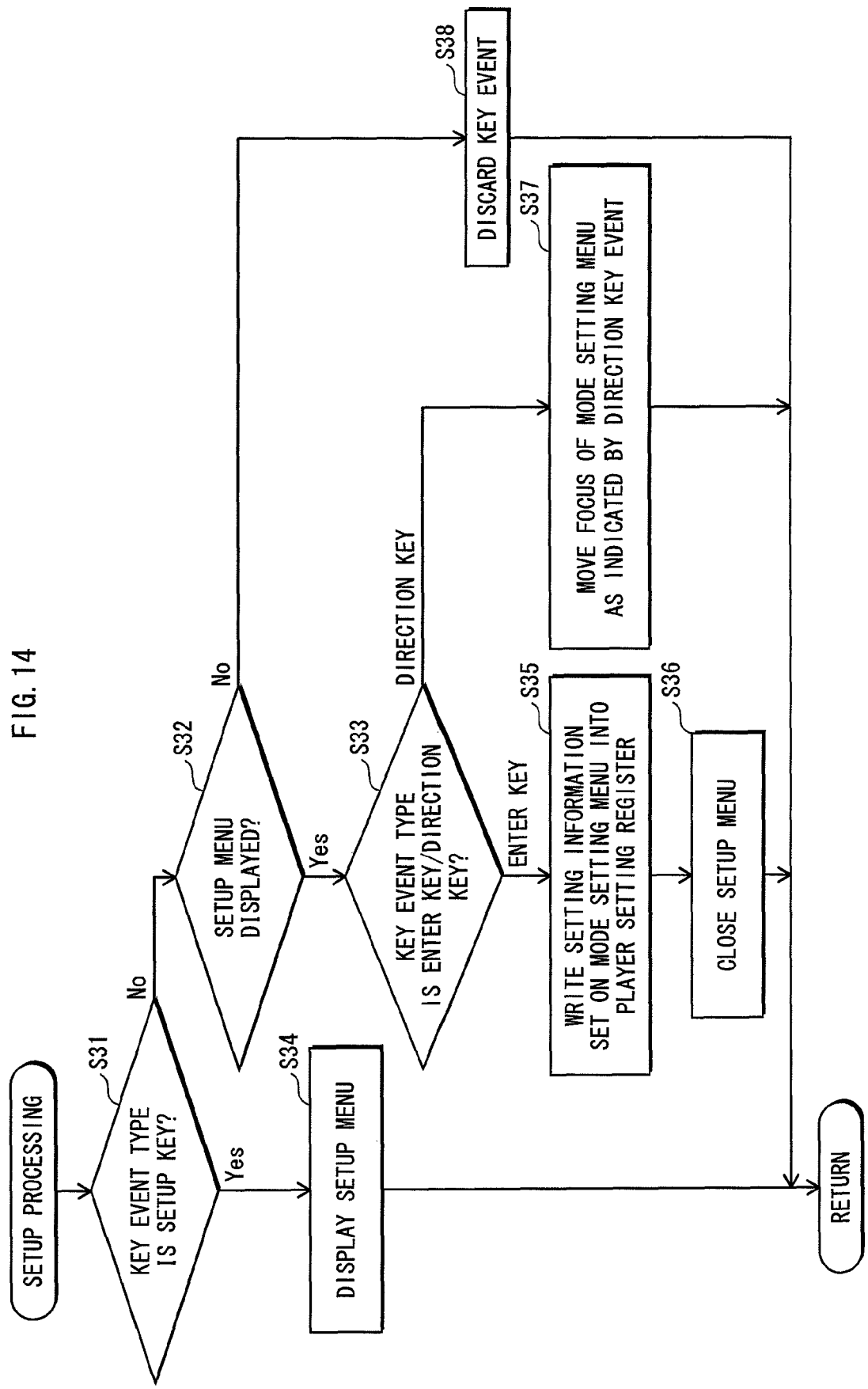
FIG. 14 is a flowchart showing processing procedures of setup processing.

FIG. 14 is a flowchart showing the setup processing. This flowchart includes three judgment steps. The processing to be executed changes depending on the combination of the judgment results.

Step S31 is for judging whether the type of the key event is the setup key, and Step S32 is for judging whether the setup menu is being displayed. Step S33 is for judging whether the type of the key event is the ENTER key or the direction key.

The direction key is used for controlling the mode setting menu mn2 for setting the application EASY mode. The ENTER key is used for storing the configuration of the mode setting menu mn2 into the player setting information register 2b.

Specifically, if the mode setting menu mn2 for setting the application EASY mode is displayed on the display, Step S33 is performed for judging whether the occurred key event is for controlling the mode setting menu mn2 or for storing the configuration of the mode setting menu mn2 into the player setting information register 2b.

If judged as Yes at Step S31, the setup menu is displayed at Step S34. At this moment, the mode setting menu mn2 for setting the application EASY mode, shown in FIG. 9, is displayed. This menu includes, for example, the setting items for the automatic speed control and the speed level. When the automatic speed control is turned on, the setting item for the speed level appears so that the user can set the speed level.

If judged as No at Step S31, judged as Yes at Step S32, and judged as "key event type=ENTER key" at Step S33, the setting information that has been set from the setup menu at Step S35 is written into the player setting register 2b, and the setup menu is closed at Step S36. Then, the processing returns to the main routine.

If judged as Yes at Step S32, and judged as "key event type=direction key" at Step S33, the focus of the setup menu is moved as indicated by the direction key event (Step S37). Then, the processing returns to the main routine.

While the mode setting menu mn2 is being displayed, if the ENTER key is pressed, "ON" is set to the automatic speed control of the player setting information stored in the player setting register 2b, and "1" is set to the speed level. Then, the processing returns to the main routine.

If judged as No at Step S32, the key event is discarded at Step S38, and the processing returns to the main routine.

According to this embodiment described above, in the case of starting up applications that run in parallel in response to a user's operation during the playback of the AV stream, if the automatic speed control in the player setting information stored in the player setting register 2b is ON, the AV stream is paused or played back according to the speed level indicated in the player setting information, which is slower than the normal playback speed. Accordingly, it is possible to give a longer operation time to the user who operates the interactive applications. Therefore, even if the playback time at the normal speed of the AV stream is extremely short, it is possible to secure [[an]] enough operation time for the user to operate the applications executed in synchronization with the AV playback.

The Second Embodiment

In the first embodiment above, the control information setting unit 13 is explained as a built-in type program that is built in the playback apparatus. The second embodiment relates to an improvement of the first embodiment, according to which the control information setting unit 13 is provided via the BD-ROM 100.

Figure 15A:
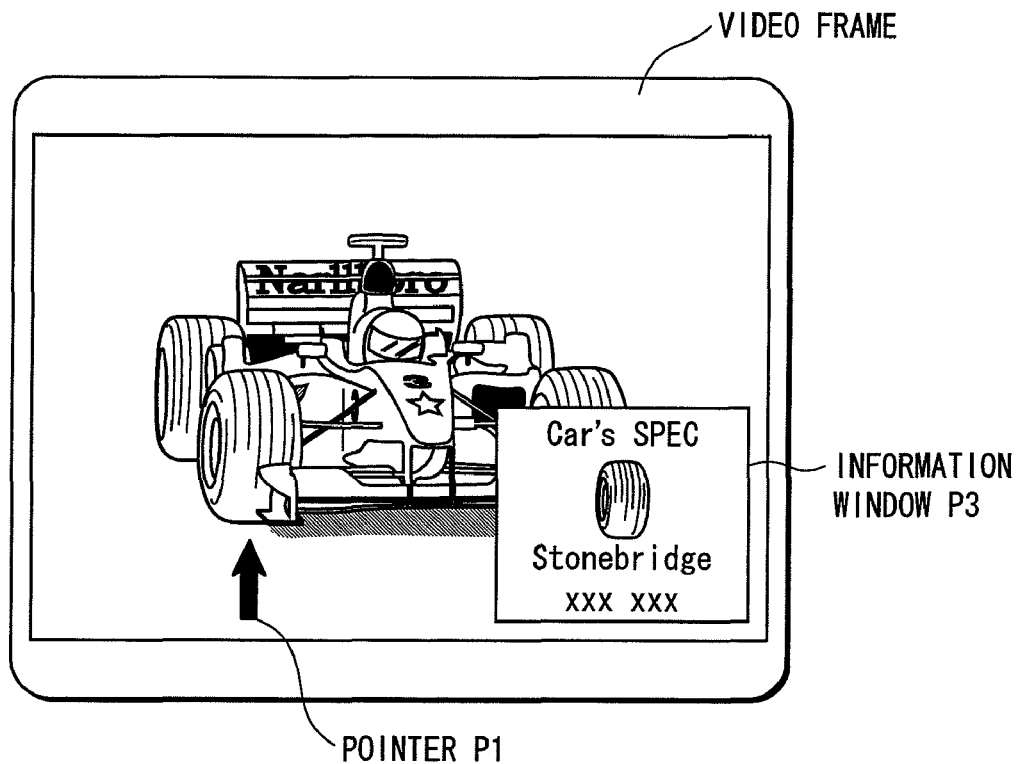
FIG. 15A shows GUI specifications of the interactive application.

The following describes the specifications of the applications taken as examples in this embodiment. FIG. 15A shows the specifications of the GUIs of the interactive application. When a direction key is pressed, the interactive application executes processing corresponding to the pressed direction key. Through this key event processing, a point p1 is displayed in the video frame on the display screen. The user can select a selectable object displayed within the video frame. The user can click an object image in the video frame, using the point p1. In FIG. 15A, an F1 car is illustrated as an object image. When the user clicks on the F1 car, an information window p3 pops up. This image screen shows an explanation of the clicked part of the object included in the video frame. In this example, the drawing shows that a tire part of the F1 car has been clicked and details of the part is displayed as the spec of the F1 car. In this example, the information window p3 shows the manufacturer of the tire (Stonebridge).

Figure 15B:
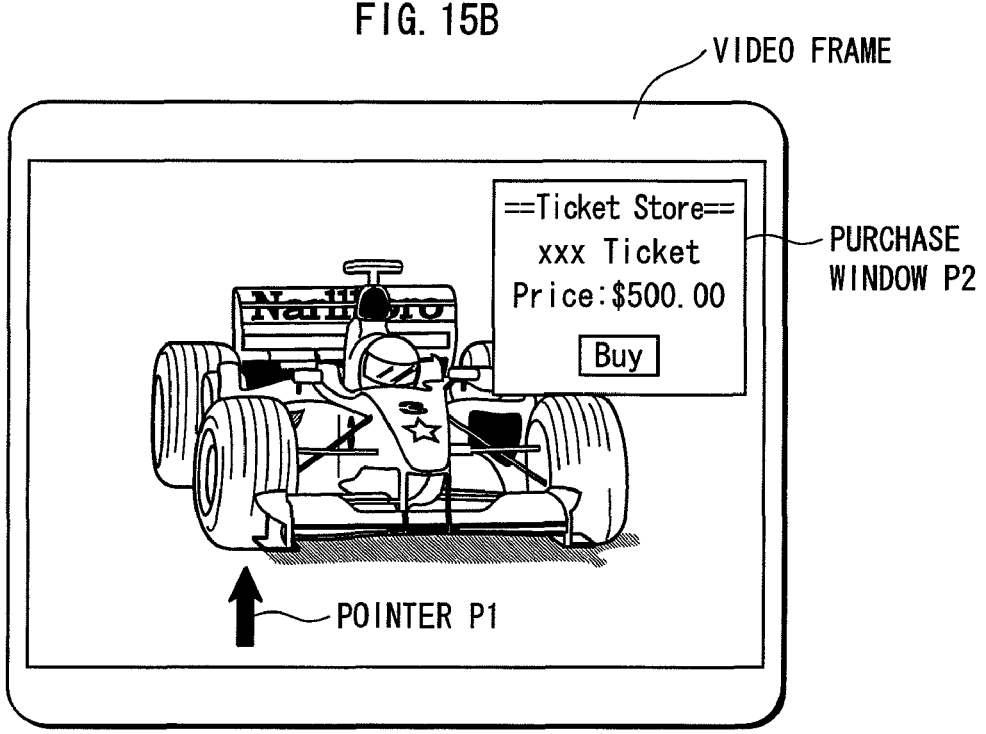
FIG. 15B shows GUI specifications of the online shopping application.

The online shopping application program is started up when a red key on the remote control is pressed. A particular role has been assigned to this key. The user can buy a ticket on line using the application. In other words, the online shopping application of this embodiment is started up when the key having a particular role is pressed. FIG. 15B shows the specifications of the GUIs of the online shopping application. The video frame in this drawing includes a purchase window p2 of the online shopping application, from which the user can buy the ticket. The purchase window p2 includes the business owner of the online shopping application (=Ticket Store=), the title of the item (xxx Ticket), the price of the item (Price: $500.00), and a button for accepting the purchase (BUY). When displaying such a purchase window p2, it is preferable that the playback speed of the AV stream is under control, in the same manner as in the first embodiment.

Figure 16:
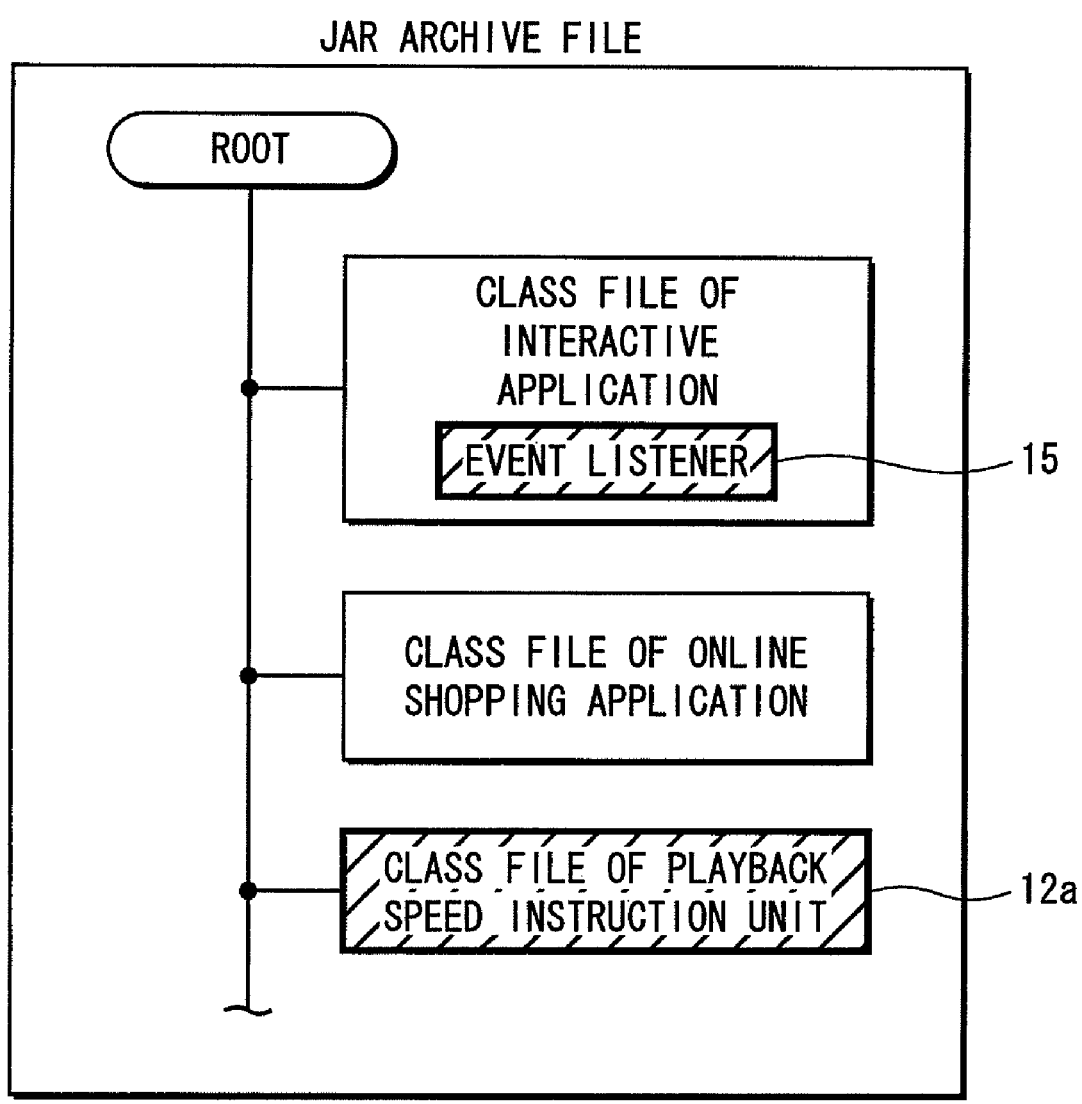
FIG. 16 shows an internal structure of a JAR file pertaining to the second embodiment.

FIG. 16 shows the internal structure of the JAR file pertaining to the second embodiment. This drawing is based on FIG. 2A, and the hatchings show the differences from FIG. 2A. Specifically, this embodiment is improved from the first embodiment in that the JAR file includes a class file of a playback speed instruction application 12a, and an event listener 15 for select a key event for starting up the playback speed instruction application 12a is included in the class file of the interactive application.

Figure 17:
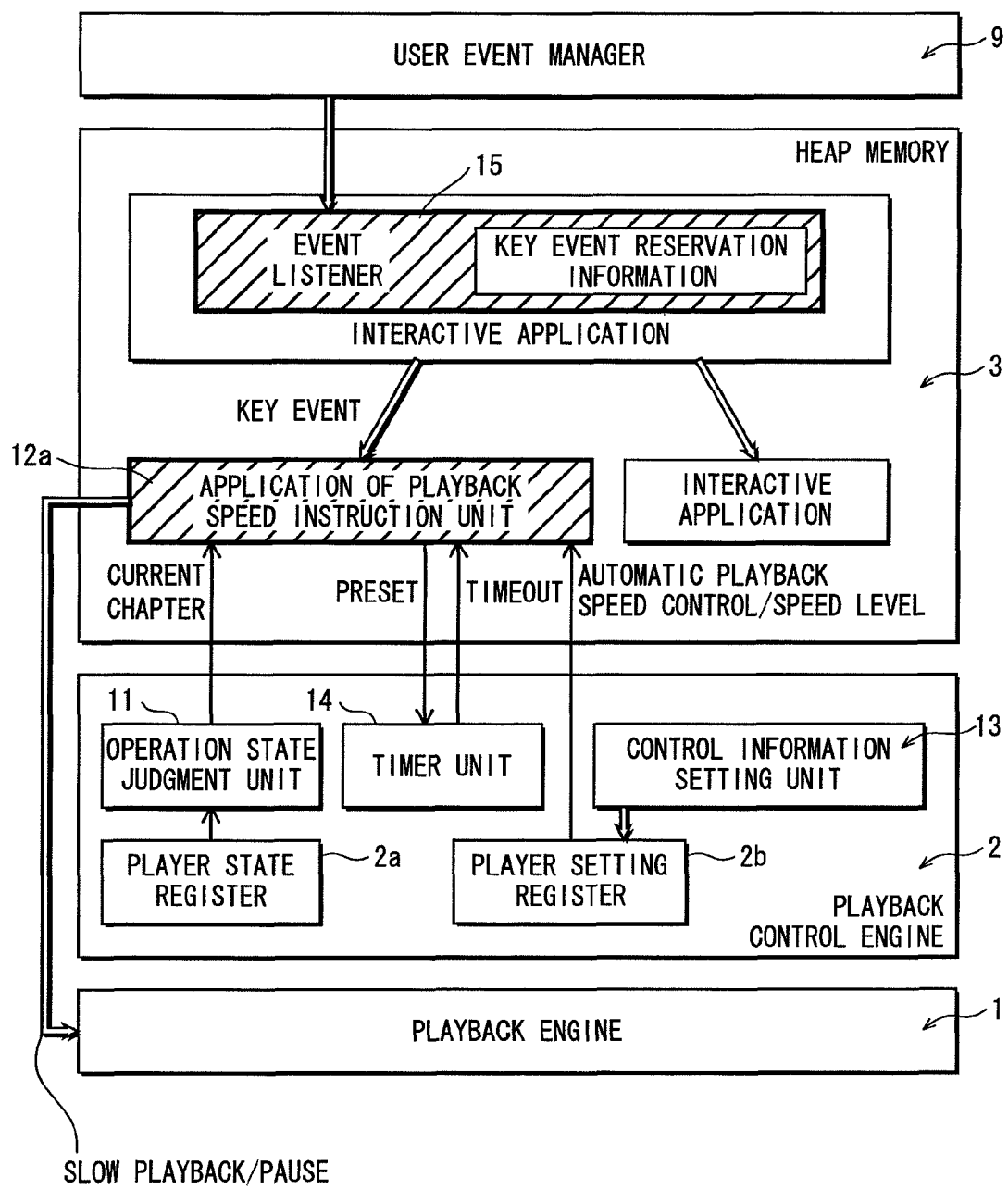
FIG. 17 shows how instances of class files pertaining to the second embodiment operate.

FIG. 17 shows how the instances of the class files pertaining to the second embodiment operate. This drawing is based on FIG. 6. In this layer model, the playback speed instruction application 12a is depicted in the heap memory 5. Also, the player state register 2a, the player setting register 2b, the operation state judgment unit 11, the playback speed instruction unit 12 and the timer management unit 14 are additionally written in the playback control engine 2. The following explains the new components, namely the event listener 15 and the playback speed instruction application 12a.

<The Event Listener 15>

The event listener 15 stores therein key event reservation information. The key event reservation information shows, among key events that can be accepted by the application, a key event that is to be performed with changing of the playback speed. Upon receiving such a key event from the operation receiving unit 112, the event listener 15 causes the application to perform processing corresponding to the received key event while instructing the playback speed instruction application 12a to control the playback speed. On the other hand, in the case of receiving a key event that does not require the speed change, the event listener 15 causes the application to perform processing corresponding to the received key event, and does not give the instruction to the playback speed instruction application 12a.

<The Playback Speed Instruction Application 12a>

Upon receiving the instruction to control the playback speed, the playback speed instruction application 12a instructs the playback engine 1 to control the playback speed according to the instruction. Since the playback speed instruction application 12a is provided to the BD-J module 3 from the class files on the BD-ROM 100, and operates on the BD-J module 3, the playback speed instruction application 12a reads the current title number and the current chapter number from the player state register 2a in the playback control engine 2, and reads the settings of the automatic speed control and the speed level from the player setting register 2b in the playback control engine 2. Also, the playback speed instruction application 12a instructs the timer management unit 14 in the playback control engine 2 to start the time measuring, and receives notification of the timeout from the time management unit 14.

Figure 18:
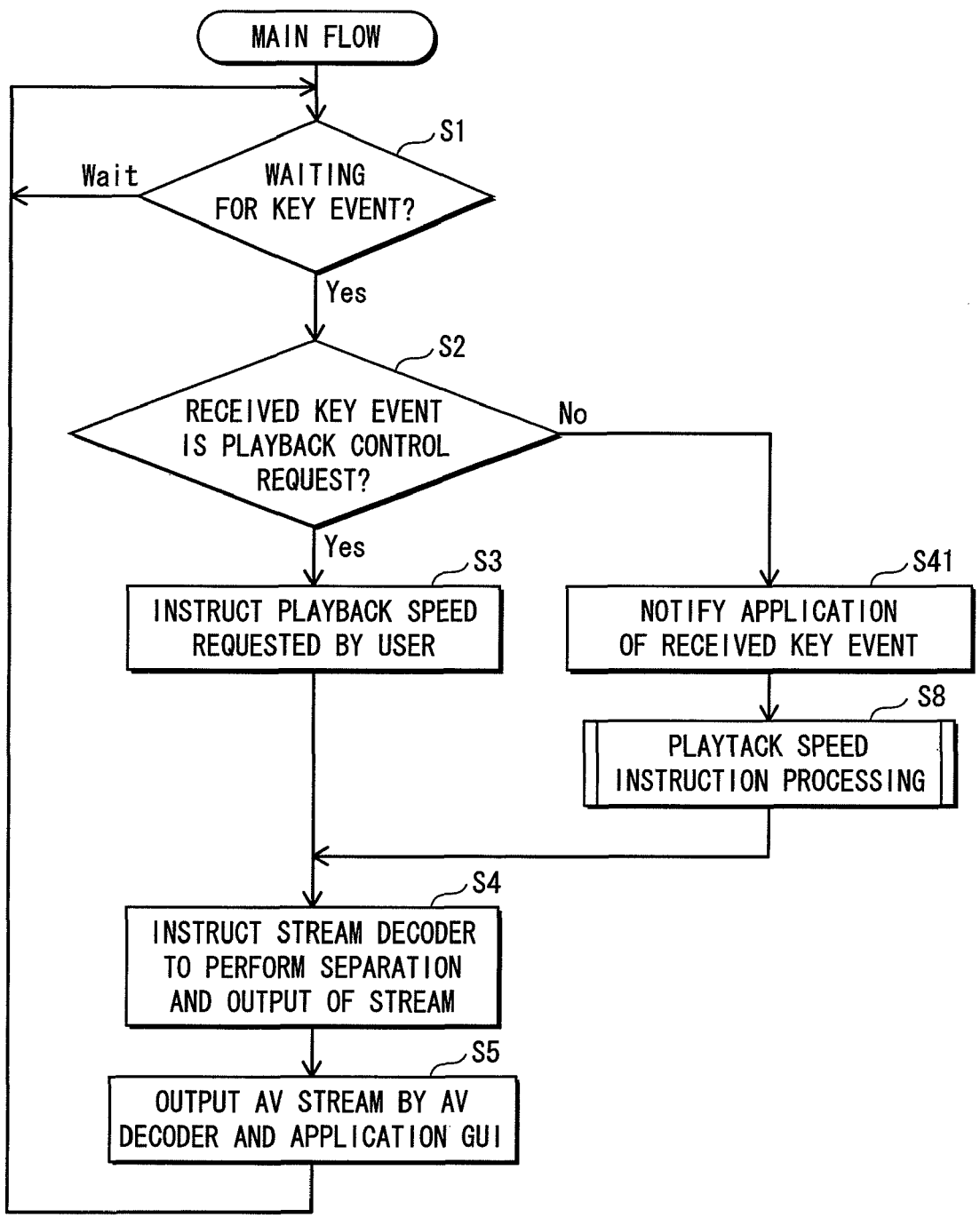
FIG. 18 is a flowchart showing processing procedures as a main flow in the second embodiment.

FIG. 18 is a flowchart showing the main processing procedures pertaining to the second embodiment. This drawing is based on FIG. 11, the same step numbers are given to the same steps as FIG. 11.

At Step S1, the operation receiving unit 112 is in the state of waiting for an operation input by the user from the remote control. If the operation receiving unit 112 receives the input, the result of the judgment at Step S1 is Yes, and the processing moves to Step S2. Step S2 is for judging whether or not the received operation input is a playback control request (playback, pause, and so on). If judged as Yes at Step S2, an instruction is provided to perform the playback at the playback speed requested by the user (Step 3), and the processing moves to Step 4.

If judged as No at Step 2, the received key event is notified to the application (Step S41), and the playback speed instruction processing (Step S8) is performed. Then, the processing moves to Step S4.

At Step S4, the stream decoder 105 decodes the input stream to separate it into video data and audio data, and outputs them to the AV decoder 106. At Step S5, the application program generates graphics images according to need. At the same time, the AV decoder 106 decodes the video data and the audio data while keeping the synchronization between them. The AV decoder 106 outputs the decoded audio to the speaker and outputs the decoded video to the display.

Figure 19:
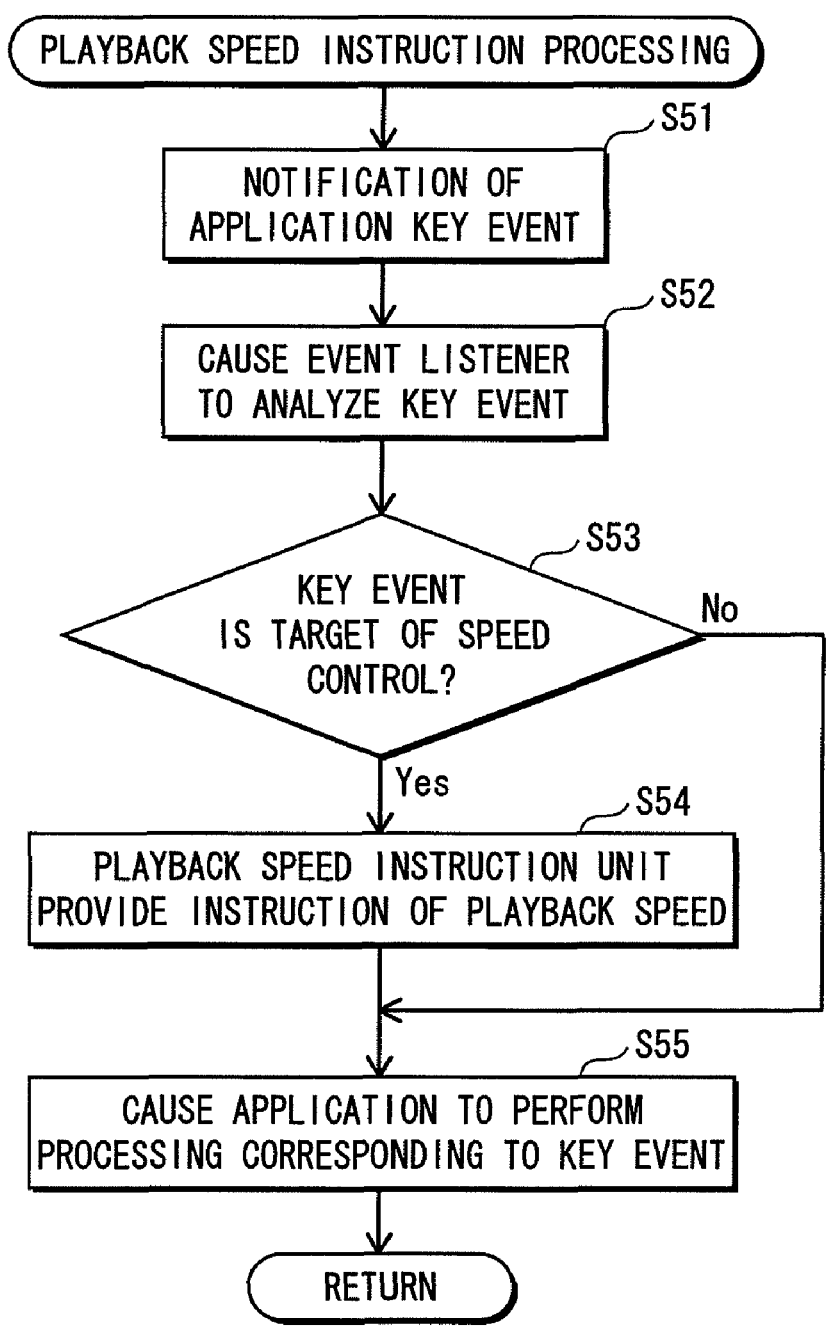
FIG. 19 is a flowchart showing processing procedures of playback speed instruction processing.

FIG. 19 is a flowchart showing the processing procedures of the playback speed instruction.

Step S51 is a step for waiting for a notification of a key event from the application. If a key event is notified, the event listener is caused to analyze the key event (Step S52). Step S53 is for judging whether the key event is registered in the key event reservation information, as a target of the speed control. If judged as No (not registered) at Step S53, Step S54 is skipped, and the processing moves to Step S55.

If judged as Yes (registered) at Step S53, the playback speed instruction application 12*a* provides the instruction of the playback speed (Step S54), and the application is caused to perform the processing corresponding to the key event (S55), and the processing returns to the main routine.

The following describes the case where the user operates the interactive application program during the playback of the AV stream.

When the red key is pressed, the event listener performs the processing corresponding to the received key event, that is, the processing to display the purchase window p2 on the screen. At the same time, the event listener judges that the key event is of a key that is a target of the playback speed control, and instructs the playback speed instruction application 12*a* to control the playback of the AV stream that is being played. Upon receipt of this instruction, the playback speed instruction application 12*a* instructs the playback engine 1 to display the AV stream that is in the state of being paused.

Upon receipt of the instruction, the playback engine 1 displays the AV stream and the purchase window p2 overlaid on the video frame. This state is illustrated in FIG. 15B. In this state, the user performs certain operations to make a purchase. After that, the purchase window p2 will be closed, and the AV playback will return to the normal.

According to the second embodiment above, it is possible to start up the application programs in accordance with operation inputs, by generating in advance an application including the event listener 14 and the playback speed instruction application 12*a* and recording their class files on the BD-ROM 100. As a result, an application program intended by the creator of the AV stream can be played back at an intended speed, with an intended timing such as when the user presses a particular key.

The manufacture of the playback apparatus can enable the playback apparatus to perform the same function as the playback speed instruction unit 12 as explained in the first embodiment, by providing the AV stream provider with a library that can be used for generating the playback speed instruction application 12*a*. As a result, it is possible to realize the same processing as the first embodiment with use of an older type of playback apparatus in which the program of the playback speed instruction unit 13 is not built as a built-in program.

The Third Embodiment

Figure 20:
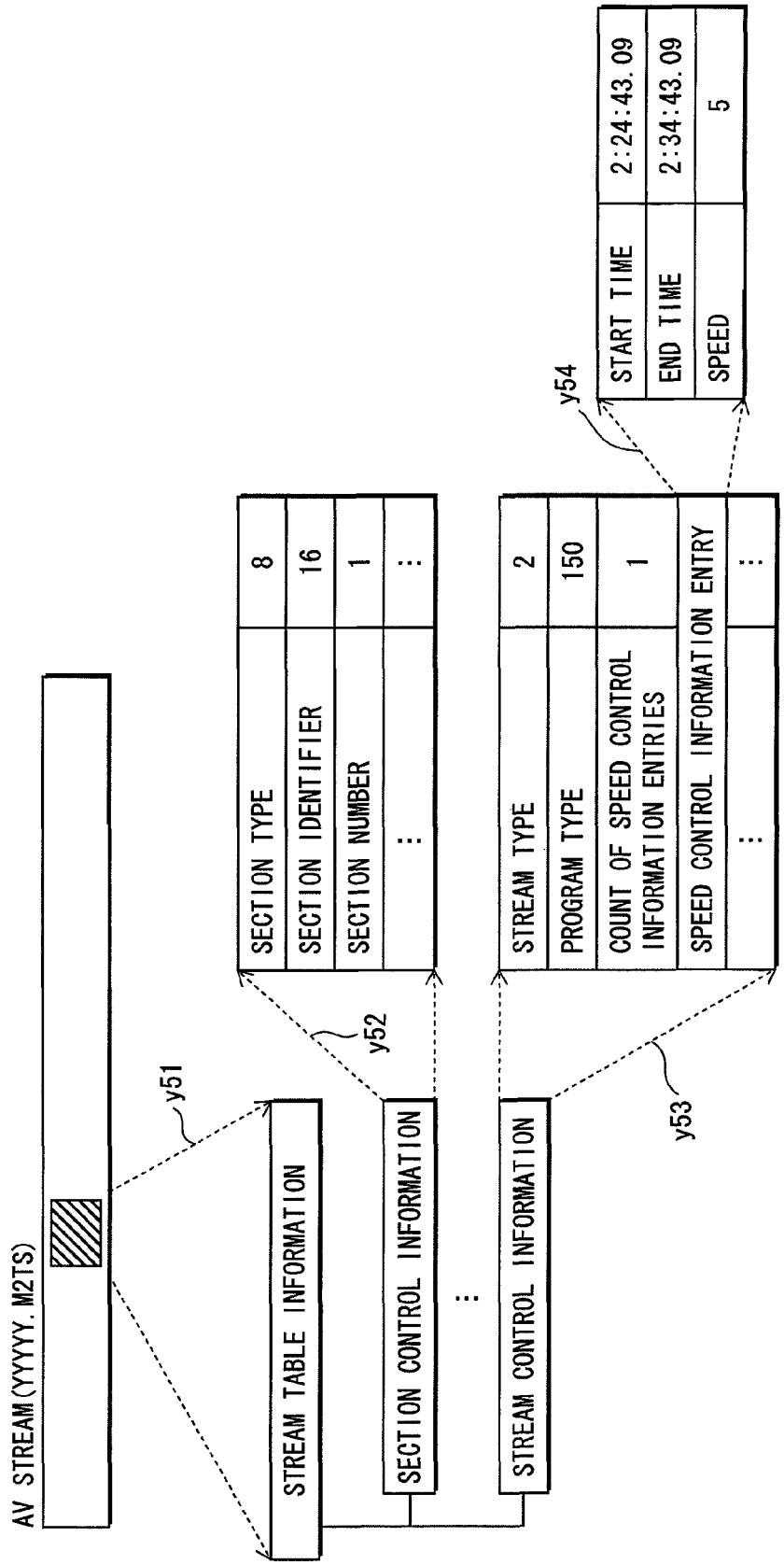
FIG. 20 shows an AV stream in which information for speed control is incorporated.

The second embodiment improves the present invention in that the application for the speed control is provided from the recording medium. The third embodiment improves the present invention in that the information relating to the speed control is included in the AV stream. FIG. 20 shows an AV stream in which the information for speed control is included.

The top tier in this drawing shows an AV stream that has a file name "YYYYY.M2TS" and is stored in the BD-ROM. As the hatching shows, this AV stream includes stream table information. The lead lines y51 show the up-close details of the stream table information. The stream table information includes "section control information" and "stream control information".

The lead lines y52 show the up-close details of the "section control information". As the lead lines y52 show, the section control information includes a section type ("8" in the drawing), a section identifier ("16" in the drawing), and a section number ("1" in the drawing).

The lead lines y53 show the up-close details of the "stream control information". As the lead lines y53 show, the stream control information includes a stream type ("2" in the drawing), a program type ("150" in the drawing), the count of speed control information entries ("1" in the drawing), and speed control information entries. The lead lines y54 show the up-close details of an entry of the speed control information. As the lead lines y54 show, the control information includes a start time ("2:24:43.09" in the drawing), an end time ("2:34:43.09" in the drawing), and a speed ("5" in the drawing).

The above are the explanations for the improvement of the data on the BD-ROM. The following explains an improvement of the playback apparatus.

Figure 21:
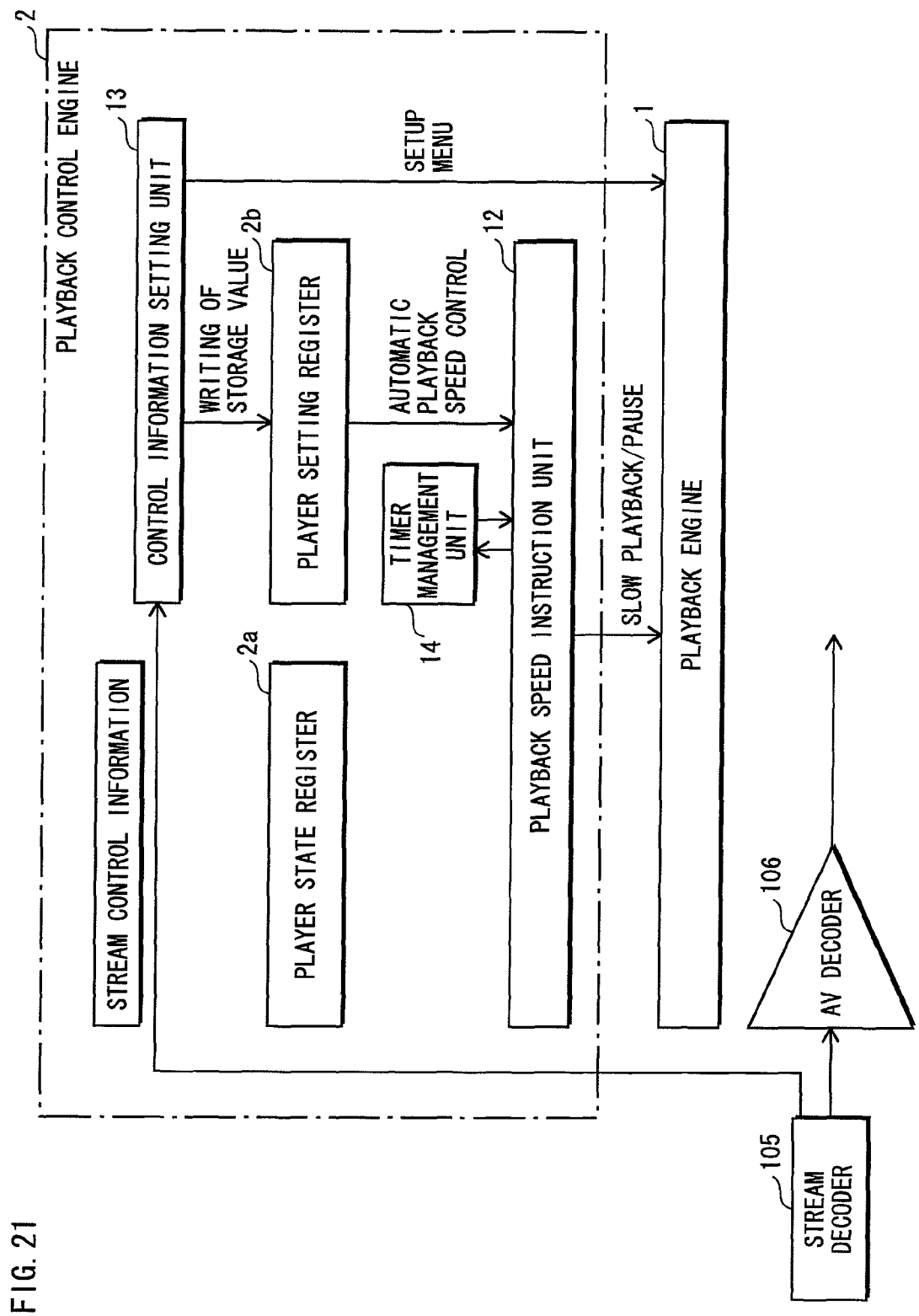
FIG. 21 shows components that particularly relate to improvement in the third embodiment (i.e. a stream decoder 105, a playback control engine 2, and a control information setting unit 13)

Among the components of the playback apparatus of the first embodiment, FIG. 21 shows components that particularly relate to the improvement in the third embodiment (i.e. the stream decoder 105, the playback control engine 2, and the control information setting unit 13).

The following explains these improved elements.

The stream decoder 105 separates the stream control information from the AV stream, and passes it to the control information setting unit 13.

The control information setting unit 13 writes, as the speed level, the speed control information of the stream control information received from the stream decoder 105, into the player setting register 2*b*.

Due to the operations of the stream decoder 105 and the control information setting unit 13 described above, the speed control information included in the AV stream will be written into the player setting register 2*b*. The above are the explanations for the improvement of the internal structure of the playback apparatus pertaining to this embodiment. The following explains an improvement of the processing procedures of the playback apparatus pertaining to this embodiment.

Figure 22:
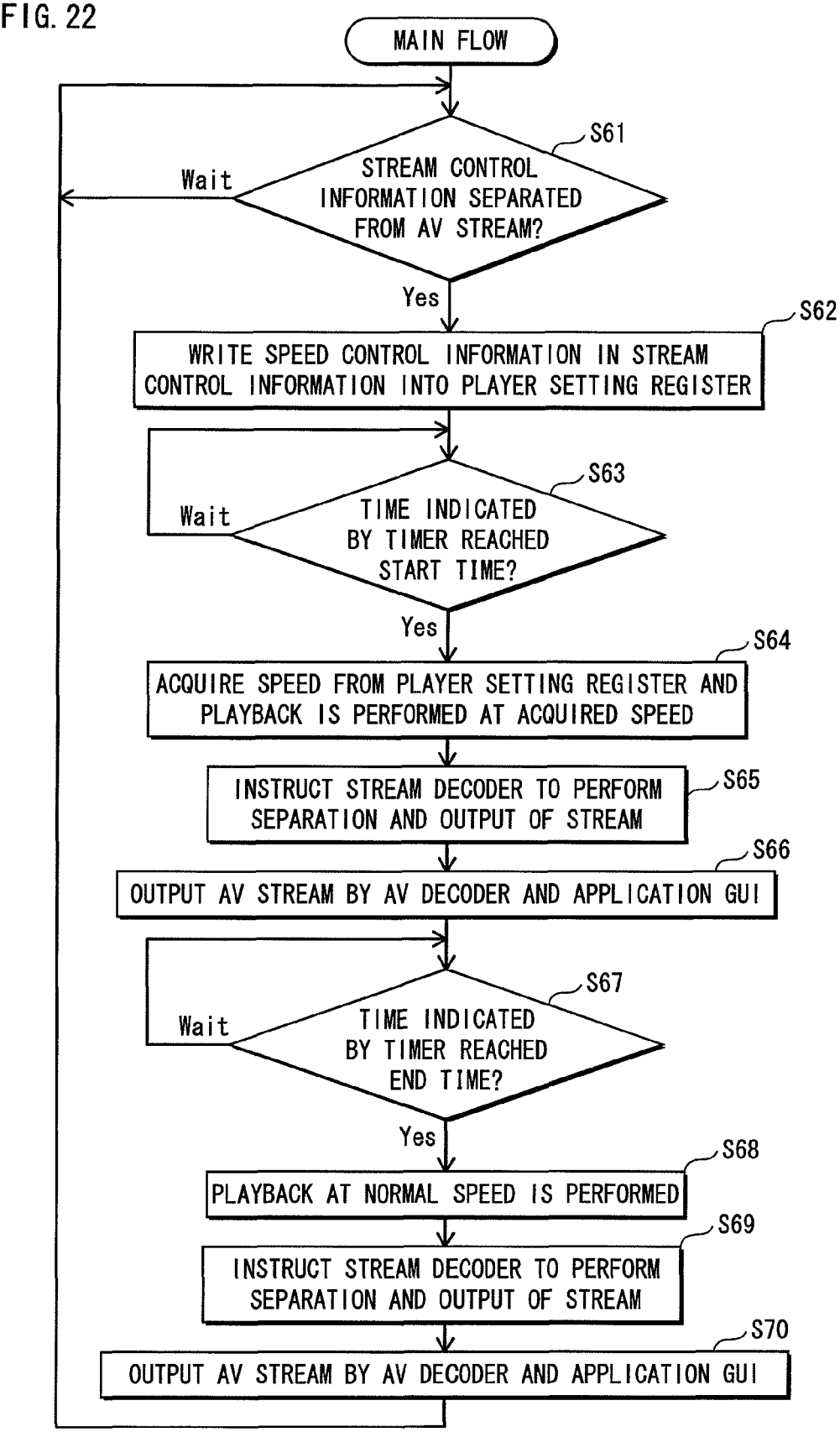
FIG. 22 is a flowchart showing processing procedures as a main flow in the third embodiment.

FIG. 22 is a flowchart showing the main processing procedures pertaining to the third embodiment.

Step S61 is a step for waiting for the completion of the separation of the stream control information from the AV stream. When the stream control information is separated from the AV stream, the speed control information included in the stream control information is written into the player setting register 2*b* (Step S62), and the processing moves to Step S63. Step S63 is a step for waiting for the time indicated by the timer to reach the start time included in the speed control information. When the time indicated by the timer reaches the start time, the playback is performed at the speed acquired from the player setting register 2*b* (Step S64), and an instruction is given to the stream decoder 105 to separate the stream and outputs the resultant data (Step S65). Then, the AV playback by the AV decoder 106 and the application GUI are output (Step S66).

Step S67 is a step for waiting for the time indicated by the timer to reach the end time included in the speed control information. When the time indicated by the timer reaches the end time, the playback at the normal speed is performed (Step S68), and the stream decoder is caused to separate the stream and output the resultant data (Step S69). Then, the AV playback by the AV decoder 106 and the application GUI are output (Step S70), and the processing returns to Step S61.

According to this embodiment described above, it is possible to adjust the operation speed of the application based on the stream control information included in the AV stream. Therefore, the speed control can be realized with improved time accuracy.

The Fourth Embodiment

Figure 23:
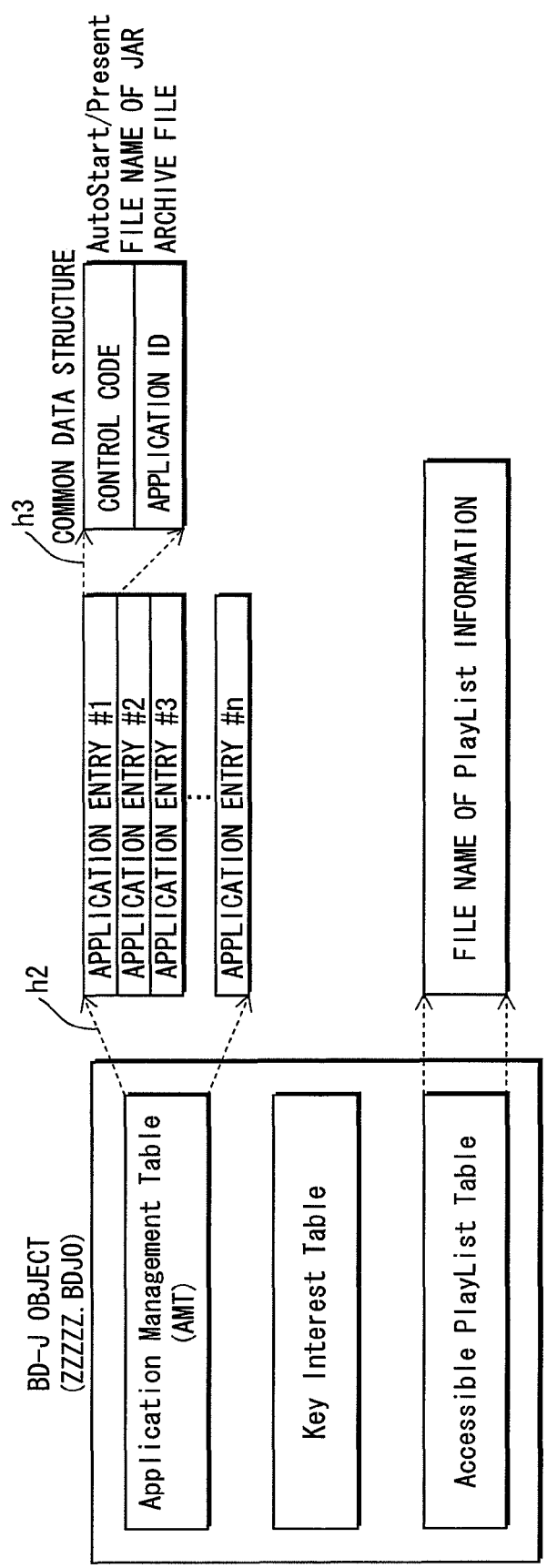
FIG. 23 shows an internal structure of an operation mode object a BD-J object) pertaining to the fourth embodiment.

This embodiment relates to how to realize the AV playback described in the first embodiment to the third embodiment. FIG. 23 shows the internal structure of the operation mode object (BD-J object) pertaining to the fourth embodiment. This drawing is based on FIG. 2B, and the difference from FIG. 2 is that the BD-J object includes an Accessible Playlist Table. The Accessible playlist table shows, for each active section of the application, playback control to be performed in parallel with the execution of the application. Since applications are instable, they sometimes cause a startup failure and an abnormal termination. As a failsafe mechanism for the startup failure and the abnormal termination, the Accessible playlist table is provided for each active section. The Accessible playlist table shows playback control to be performed when a certain active section of an application is started. This control is the AV stream playback that is based on the playlist information. The application execution and the playlist playback can be realized at the same time by causing the playback engine 1 to perform the playback control based on the playlist information.

The AV playback of this embodiment is performed based on the playlist information indicated by the Accessible playlist table of the operation mode object. Therefore, if the speed level indicated by the playback speed instruction unit 12 or the playback speed instruction application 12a is slower than the normal playback speed, the playback time length of the AV stream increases, and accordingly the time length of the title increases. In this way, it is possible to indirectly increase the operation period of the application by increasing the time length of the title through the instruction of the speed level. This gives enough time for the user to operate the GUI.
<Remarks>

Although the best modes that are knowable by the Applicant at the time of the Application have been described above, the following technical features can be further improved or modified. It should be noted that the implementer can voluntarily decide whether to implement the present invention as shown in each embodiment above or make improvements/changes to the present invention.
<The Units of Application Signaling>

In each embodiment above, the application manager realizes the application signaling by using the titles on the BD-ROM as the active sections. However, the application signaling may be realized in a different manner as long as the lengths of the active sections can be increased. For example, it is possible to realize the application signaling by using services that comply with the digital broadcast standard as the active sections. Also, the application signaling may be realized in units of the playlists and the chapters.
<The Format of the Player Information Table>

The format of the player information table in the player setting register is not limited to that described in the first embodiment. Any formats may be adopted as long as the information relating to the AV stream recorded on the recording medium in the format can be stored in the player setting register.

In the same manner, the format of the player setting information is not limited to that described in the first embodiment. Any formats may be adopted as long as the information that has been set to the playback apparatus 100 in the format can be stored in the player setting register 2b.
<The Criteria for Judging the AV Playback State>

The state of playing back the AV stream may include the state of performing specific playback such as the fast-forwarding. If this is the case, when the timer management unit notifies of the time out in the playback speed instruction processing, the playback may be return to the specific playback.
<The Speed Level>

Although the speed level in the embodiments above is defined in six levels from 0 to 5, the number of the levels is not limited to six. The number of levels may be any.

Although it is assumed in the embodiment above that the speed level "0" indicates the paused state, the definition is not limited to this. For example, the speed level "5" may indicate the paused state. In other words, it is only necessary that any of settable speed levels corresponds to the paused state.
<Implementation as a System LSI>

Figure 24:
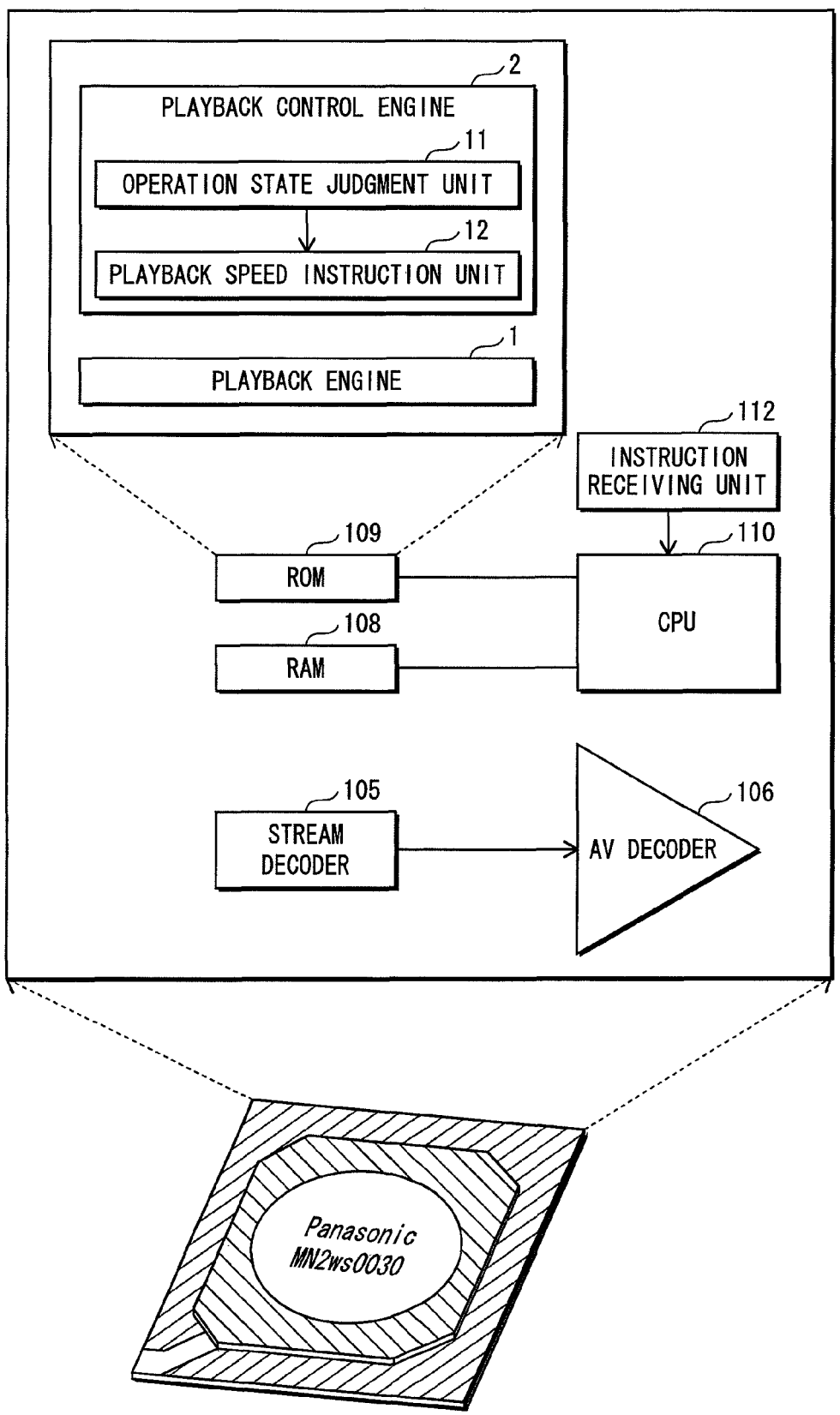
FIG. 24 schematically shows a system LSI in which a stream decoder 105, an AV decoder 106, a RAM 108, a ROM 109, a CPU 110 and an instruction receiving unit 112 are incorporated.

Among the hardware components depicted in FIG. 5, the stream decoder 105, the AV decoder 106, the RAM 108, the ROM 109, the CPU 110, and the instruction receiving unit 112 may be structured as a single system LSI. The ROM 109 includes the playback engine 1, and the playback state judgment unit 11 and the playback speed instruction unit 12 which are included in the playback control engine 2, among the software components depicted in FIG. 10. FIG. 24 schematically shows a system LSI that includes the stream decoder 105, the AV decoder 106, the RAM 108, the ROM 109, the CPU 110 and the instruction receiving unit 112.

A system LSI is a package including a bare chip implemented on a high-density substrate. A package that includes a plurality of bare chips implemented on a high-density substrate and has an appearance like a single LSI is also referred to as a system LSI (Such a system LSI is called "multi-chip module").

Here, in terms of types of the package, there are a QFP (Quad Flat Package) type and a PGA (Pin Grid Array) type. The QFP is a system LSI in which pins are attached to the four sides of the package. The PGA is a system LSI in which many pins are disposed all over the bottom face of the package.

These pins have a role as an interface with other circuits. Due to this role, in connection with other circuits, the system LSI works as the core of the playback apparatus.

Figure 25:
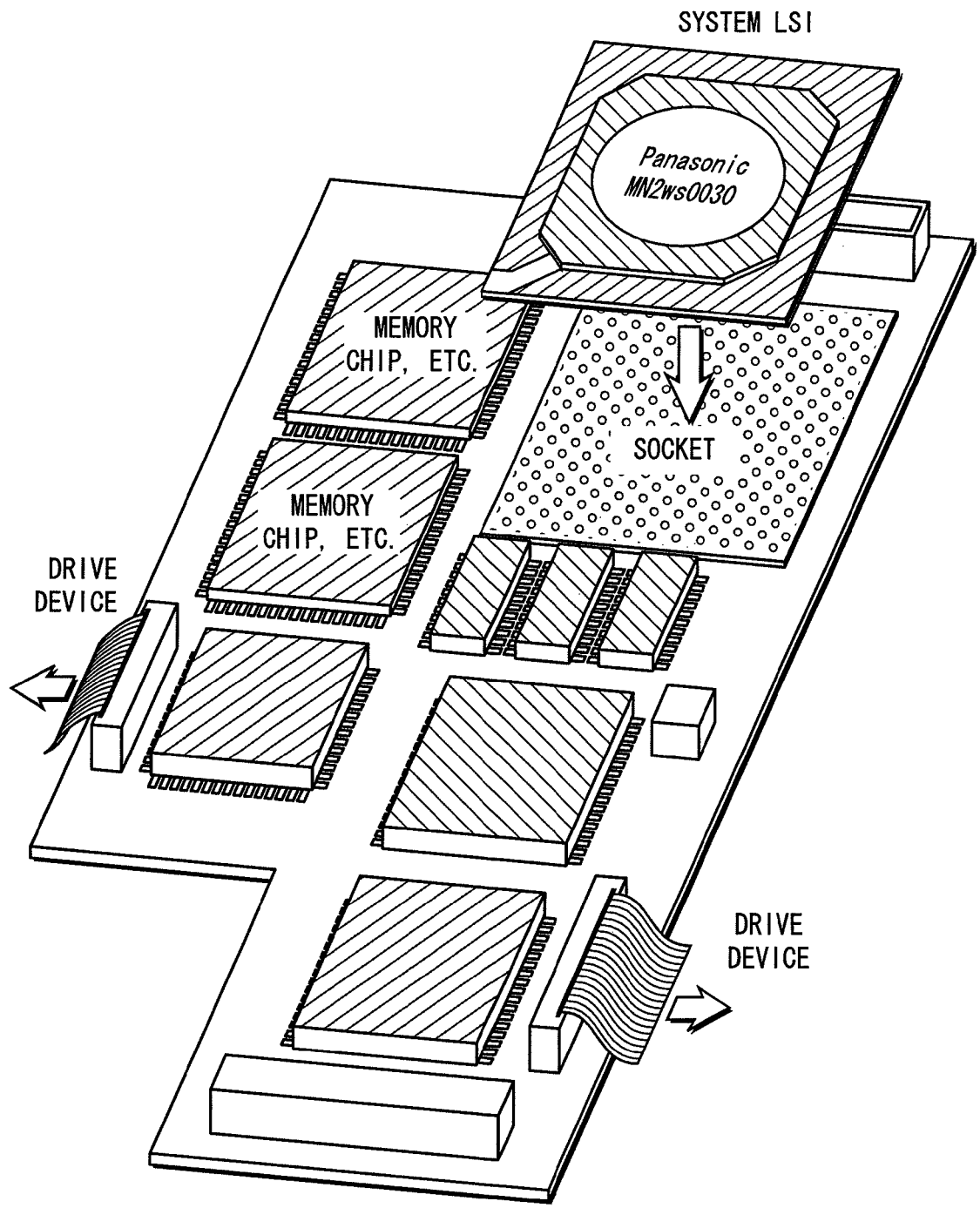
FIG. 25 shows a way of incorporating the system LSI into the playback apparatus.

Such a system LSI can be incorporated not only in a playback apparatus but various apparatuses that play videos, such as TVs, personal computers, mobile phones complying with one-segment broadcasting system, and so on. Therefore, the system LSI expands the range of the purpose of the present invention. FIG. 25 shows a way of incorporating the system LSI into the playback apparatus.

Since the purpose of the system LSI mentioned above is to realize the functions of the playback apparatus, it is preferable that the system LSI complies with the UniPhier architecture.

A system LSI complying with the UniPhier architecture includes the following circuit blocks:

Data Parallel Processor (DPP)

The Data Parallel Processor is an SIMD type processor in which a plurality of element processors performing the same operations. Computing device included in each element processor operate at the same time according to a single instruction so that decoding of a plurality of pixels constituting a picture can be performed in parallel.

Instruction Parallel Processor (IPP)

The Instruction Parallel Processor includes a "Local Memory Controller" constituted of an instruction RAM, an instruction cache, a data RAM and a data cache, a "Processing Unit" constituted of an instruction fetch unit, a decoder, an execution unit and a register file, and a "Virtual Multi Processor Unit" that instructs the Processing Unit to execute a plurality of applications in parallel.

CPU Block

The CPU block includes peripheral circuits such as an ARM core, an external bus interface (Bus Control Unit: BCC), a DMA controller, a timer and a vector interruption controller, and peripheral interfaces such as a UART, a GPIO (a General Purpose Input Output) and a synchronous serial interface. The controllers mentioned above are implemented as part of the CPU block in the system LSI.

Stream I/O Block

The stream I/O block realizes data input/output via a USB interface and an ATA packet interface from/to a drive device, a hard disk drive device and an SD memory card drive device, which are connected to the external bus.

AV I/O Block

The AV I/O block includes an audio input/output, a video input/output and an OSD controller, and realizes data input/output from/to a TV and an AV amplifier.

Memory Control Block

The memory control block is a block for realizing reading and writing on a SD-RAM connected via the external bus, and includes an internal bus connection unit that controls the internal connections among the blocks, an access control unit that performs data transfer from/to the SD-RAM connected to the outside the system LSI, and an access schedule unit that controls access requests from the blocks to the SD-RAM.

The manufacturing process is specifically as follows: Firstly, create a circuit diagram of a part to be realized as the system LSI, based on the structure diagrams shown in the embodiments above, and realize the components shown in the structure diagrams using circuit elements, ICs and LSIs.

Then, define a bus that connects among the circuit elements, the ICs and the LSIs, and peripheral circuits thereof, and an interface to the outside. Further, define connection lines, power source lines, ground lines, clock signal lines and so on. It is necessary to complete the circuit diagram while adjusting the operation timings of the components and securing the bandwidths required for the components, in terms of the spec of the LSI.

After completion of the circuit diagram, implementation designing should be conducted. The implementation designing is a process of creating a substrate layout, performed to determine the positions of the parts (the circuit elements, the IC, the LSI) on the substrate as shown on the circuit diagram, and how to connect the connection lines on the substrate as shown on the circuit diagram.

As layout on the substrate is determined by the implementation designing, the result of the implementation designing is converted to CAM data, and output to the NC machine tool or the like. The NC machine tool performs SoC implementation and SiP implementation, based on the CAM data. The SoC (System on chip) implementation is a technique to print a plurality of circuits on a single chip. The SiP is a technique to form a single package from a plurality of chips, using resins or the like. The system LSI pertaining to the present invention can be manufactured through the processes mentioned above, based on the drawings showing the internal structure of the playback apparatus explained in each of the embodiments above.

Note that the integrated circuit generated as described above may be variously referred to as an IC, an LSI, a super LSI or an ultra LSI, depending on the degree of the integration.

The system LSI realized with use of an FPGA includes many logic elements disposed in a grid pattern. It is possible to realize the hardware structures shown in the embodiments above by connecting the horizontal and the vertical lines according to the input/output combination described in the LUT (Look Up Table). The LUT is stored in the SRAM, and the content of the SRAM disappears when it is powered off. Therefore, when using such an FPGA, it is necessary to write the LUT for realizing the hardware structures into the SRAM, using configuration information.

<The Directory Structure>

The HDD 102 and the memory card drive 103 may be realized as local storages that can be accessed with use of methods acquired from the Java™ IO package. The HDD 102 and the memory card drive 103 structure a so-called virtual package if they realized as local storages.

Here, a local storage has a plurality of domain areas. A domain area is a directory corresponding to a disk root certificate that is unique to a BD-ROM. Under this directory, directories for each organization are placed.

The disk root certificate is a root certificate that has been given to a creator of the BD-ROM by a root certificate authority and allocated to the BD-ROM by the creator. The disk root certificate is encoded in the X.509 format, for example. The specification of the X.509 format is published by the CCITT, and disclosed in "CCITT Recommendation X.509 (1988), "The Directory—Authentication Framework".

The directories of each application of an organization are the same as those of the MHP. In other words, the local storage has a structure in which the directories of each application of the organization are located under the directory corresponding to the root certificate. This structure maintains the compatibility with the storage method of the MHP. Here, part of the file paths for accessing the directories in the local storage, corresponds to the root certificate, is called a "local storage root".

It is preferable that a class object is generated based on class files read from the directory corresponding to the disk root certificate of the BD-ROM, using the local storage root, and provided to be executed by the Java™ virtual machine 4.

Also, it is preferable that the contents of the BD-ROM and the local storage area are encrypted according to the Advanced Access Content System (AACS) with signature information added thereto, and the right to use is defined in a permission file.

For example, whether or not a desired file exists at a location indicated by a file path "/Persistent/1/1/streams/" can be checked with use of the exists ( ) method of the Java™. The following shows an example of the exists ( ) method of the case where the desired file is "O.m2ts": new Java™.io.File ("/Persistent/1/1/streams/0.m2ts").exists( );

<The Storage into the Application Cache 6>

It is preferable that the BD-J object as the operation mode object described in the embodiments above includes cache management information, and the storage into the application cache 6 is performed based on this cache management information. The cache management information shows files of which application should be read into the application cache 6 when the title corresponding to the BD-J object becomes the current title, before the AV playback of the current title is started.

When the current title is selected, the BD-J module 3 reads, into the application cache 6, files indicated by the cache management information included in the BD-J object corresponding to the current title, before the AV playback of the current title is started.

The cache management information includes entries respectively corresponding to the applications. Each entry instructs the playback apparatus to read the corresponding application into the application cache 6. Each entry is given a prescribed priority. The BD-J module 3 firstly reads the application that corresponds to the entry that is given the highest priority into the application cache 6, and then sequentially reads the applications corresponding to the rest of the entries into the application cache 6 in the order of descending priorities.

The applications shown in the cache management information are given group attributes. Accordingly, one between applications suitable for a minimum standard memory size and applications suitable for an operational environment with a larger memory size can be loaded into the application cache 6 of the playback apparatus according to the memory size of the playback apparatus. Therefore, it is possible to secure operations under the minimum standard environment, while providing people in charge of the authoring with an environment that highly motivates them.

It becomes possible to perform control to exclusively allocate one of applications having group attributes to the cache, based on the size of the application cache 6. Since only one application is loaded into the application cache 6 in accordance with the memory size, it is possible to run an application with a higher quality depending on the grade of the playback apparatus, and this enables the creators to produce a variety of titles.

Each entry may be given a language attribute for identifying a language group to which the corresponding application belongs. When the current title is selected, the BD-J module 3 reads, into the application cache 6, files indicated by the cache management information in the BD-J object corresponding to the current title, before the AV playback of the current title is started. Then, the BD-J module 3 performs control for placing an application in an appropriate language in the application cache 6, among the applications having different language attributes.

<Processing of Unregistered Events>

When an event is caused by the user's operation, the user event manager 9 judges whether or not the event is indicated as being valid in the Key Interest table. If judging affirmatively, the user event manager 9 outputs the key event to the application. Here, if the event caused by the user's operation is not registered in the Key Interest table, the operation corresponding to the event may be performed by the playback control engine 2.

As a result, even if the event listener of the application misses handling the event or the event listener includes a bug, the user event manager 9 performs the playback control for the playback control engine 2. Since the playback apparatus ensures comfortable operations even if the application includes a bug, the software houses as the application providers can develop differentiated playback control without hesitation even bugs are found.

<Realizing GUI Screen>

The GUI screens mentioned in the embodiments above are preferably formed with use of OSD (On Screen Display) image data and a Look Up Table. The OSD image data represents image using a bit having a prescribed length, and allocated to each pixel. The bit length of the prescribed bit shows the number of colors used for rendering images. For example, if the length of the prescribed bit is 1 bit, the pixels of the OSD image data will be colored with two colors, and if the length of the prescribed bit is 2 bits, the pixels will be colored with four colors. If the length of the prescribed bit is 4 bits, the pixels will be colored with 16 colors.

The LUT includes a plurality of entries corresponding to pixel codes respectively. Each entry includes a mixing rate $\alpha$ which shows the output ratio among brightness data to be allocated to a pixel of the OSD, red color difference data to be allocated to the pixel, blue color difference data to be allocated to the pixel, and the OSD. To display unique colors such as red, blue, green and yellow, each entry have values of the brightness data, the blue color difference data and the red color difference data, and the values are different from each other.

Interactive operation on the GUI screen structured from the above components is realized by the following markup information including a plurality of pieces of item information. The pieces of item information included in the markup information corresponding to the selectable items displayed on the GUI screen. Specifically, the markup information includes "focus destination information" which shows destination of the focus when keys of the remote control are pressed under condition that the corresponding selectable item is focused, and "pallet information" which shows the brightness and the color in the LUT used for displaying the corresponding selectable item that enters the normal state and the focused state, and "commands" that are to be executed by the playback apparatus when the selection of the item is confirmed.

This is the data structure for realizing the GUI screen. On the other hand, the playback apparatus receives the pixel data and the OSD data for a plurality of lines and entries of the LUT, converts them to video signals by performing filtering according to the prescribed magnification rate and the mixing rate $\alpha$, and outputs the signal to the monitor of the externally connected TV receiver or the like. The playback apparatus realizes the movement of the focus among items by changing the LUT used for the display, according to the user's operation and the interactive control information.

INDUSTRIAL APPLICABILITY

The playback apparatus pertaining to the present invention is applicable to terminal apparatuses for playing AV streams that include applications programs for providing interactive services. The playback apparatus facilitates operations of application programs that can be executed in parallel with playback of video, and removes the burden of the operations.

The invention claimed is:

1. A playback apparatus comprising:
an execution unit operable to execute an application;
a playback unit operable to perform AV playback;
a receiving unit operable to receive an instruction from a user; and
a control unit,
wherein the playback unit performs the AV playback of titles stored in a recording medium,
wherein class files of the application are stored in the recording medium,
wherein the execution unit is a platform of a virtual machine, and includes a heap memory, a class loader and an application manager,
wherein the application manager performs application signaling of a title boundary on the platform, and when the playback unit starts the AV playback of any of the titles, puts the application into an executable state by instructing the class loader to generate, on the heap memory, an instance of any of the class files whose active section corresponds to the any of the titles, wherein the receiving unit includes a user event manager, wherein the user event manager generates a key event corresponding to the instruction if the instruction is valid for the any of the titles, and transmits the key event to the application in the executable state, wherein if the receiving unit receives the instruction during the AV playback by the playback unit, the control unit changes a current playback speed to a speed that corresponds to a predetermined speed level, and outputs a key event corresponding to the instruction to the application, wherein the predetermined speed level is a speed level slower than a normal speed level of the playback unit or a speed level for pausing the AV playback, and wherein the control unit instructs the playback unit to perform the AV playback at the predetermined speed level before the key event is transmitted by the user event manager.

2. The playback apparatus of claim 1,
wherein the execution unit keeps an execution speed of the application even if the playback unit performs the AV playback at the speed that corresponds to the predetermined speed level.

3. The playback apparatus of claim 2, further comprising
a setup unit operable to receive from the user a numeric value indicating a speed level, ranging from 0 to N,
wherein the speed level slower than the normal speed level is represented by a numeric value ranging from 1 to N,
wherein the speed level for pausing the AV playback is represented by a numeric value 0, and
wherein the predetermined speed level corresponds to the numeric value received by the setup unit.

4. The playback apparatus of claim 1, further comprising:
a timer; and
a timer management unit operable to manage the timer,
wherein using the timer, the timer management unit measures an elapsed time from receipt of the instruction by the receiving unit, and performs timeout notification when the elapsed time reaches a predetermined time, and
wherein the AV playback at the speed that corresponds to the predetermined speed level is to be terminated based on the timeout notification by the timer management unit.

5. The playback apparatus of claim 1, further comprising:
a player state register storing therein a parameter relating to a current state of the playback unit; and
a state judgment unit operable to judge, when the receiving unit receives the instruction, whether or not the playback unit is currently performing the AV playback, with reference to the parameter,
wherein the control unit changes the current playback speed to the speed that corresponds to the predetermined speed level only if the state judgment unit judges that the playback unit is currently performing the AV playback.

6. The playback apparatus of claim 1,
wherein the application includes an event listener,
wherein a key event as a target of speed control, included in a plurality of key events, has been registered with the event listener, and
wherein the control unit changes the current playback speed to the speed that corresponds to the predetermined speed level only if a key event, received by the receiving unit, is the target of the speed control registered with the event listener.

7. The playback apparatus of claim 1,
wherein the execution unit executes the application by generating an instance from class files stored in a recording medium,
wherein a class file of a playback speed instruction program is stored in the recording medium, and
wherein the control unit changes the current playback speed to a speed that corresponds to a speed level indicated by the playback speed instruction program.

8. The playback apparatus of claim 1,
wherein the playback unit performs the AV playback of a digital stream stored in a recording medium,
wherein the digital stream includes speed control information, and
wherein the predetermined speed level is defined in the speed control information.

9. The playback apparatus of claim 8,
wherein the speed control information shows a start position and an end position of the digital stream, and
wherein the control unit changes the current playback speed to the speed that corresponds to the predetermined speed level if the playback unit is currently performing the AV playback and the AV playback has reached the start position, and changes the speed that corresponds to the predetermined speed level back to the current playback speed if the playback unit is currently performing the AV playback and the AV playback has reached the end position.

10. The playback apparatus of claim 1,
wherein an operation mode object is stored in the recording medium,
wherein the operation mode object is a table that defines an operation mode to be applied to dynamic control of a title when playback of the title is started, and includes an application management table and a key interest table that indicates a key that is valid for the title,
wherein when the playback of the title is started, the application manager extracts the application management table from the operation mode object that corresponds to the title, and performs the application signaling based on the application management table,
wherein when the playback of the title is started, the user event manager extracts the key interest table from the operation mode object that corresponds to the title, and judges whether or not a key received by the receiving unit as the instruction is valid according to the key interest table, and
wherein the key event transmitted to the application corresponds to the key that is defined as valid in the key interest table.

11. The playback apparatus of claim 10,
wherein playlist information referring to an AV stream is stored in the recording medium,
wherein the operation mode object includes accessible playlist information indicating a playlist that is to be automatically played when an instruction to play back the title is made, and
wherein the playback unit performs the AV playback by playing the AV stream based on the playlist indicated by the accessible playlist information.

12. A system LSI comprising:
an execution unit operable to execute an application;
a playback unit operable to perform AV playback;

a receiving unit operable to receive an instruction from a user; and
a control unit,
wherein the playback unit performs the AV playback of titles stored in a recording medium,
wherein class files of the application are stored in the recording medium,
wherein the execution unit is a platform of a virtual machine, and includes a heap memory, a class loader and an application manager,
wherein the application manager performs application signaling of a title boundary on the platform, and when the playback unit starts the AV playback of any of the titles, puts the application into an executable state by instructing the class loader to generate, on the heap memory, an instance of any of the class files whose active section corresponds to the any of the titles,
wherein the receiving unit includes a user event manager,
wherein the user event manager generates a key event corresponding to the instruction if the instruction is valid for the any of the titles, and transmits the key event to the application in the executable state,
wherein if the receiving unit receives the instruction during the AV playback by the playback unit, the control unit changes a current playback speed to a speed that corresponds to a predetermined speed level, and outputs a key event corresponding to the instruction to the application,
wherein the predetermined speed level is a speed level slower than a normal speed level of the playback unit or a speed level for pausing the AV playback, and
wherein the control unit instructs the playback unit to perform the AV playback at the predetermined speed level before the key event is transmitted by the user event manager.

13. A playback method using a computer including a processor, the playback method comprising:
an execution step of executing an application on the computer;
a playback step of performing AV playback;
a receiving step of receiving an instruction from a user; and
a control step,
wherein the AV playback of titles stored in a recording medium is performed in the playback step,
wherein class files of the application are stored in the recording medium,
wherein the execution step is performed on a platform of a virtual machine in the computer, and the platform of the virtual machine causes a heap memory, a class loader and an application manager to operate on the processor included in the computer,
wherein the application manager performs application signaling of a title boundary on the platform, and when the AV playback of any of the titles is started in the playback step, puts the application into an executable state by instructing the class loader to generate, on the heap memory, an instance of any of the class files whose active section corresponds to the any of the titles,
wherein the receiving step includes a user event manager,
wherein the user event manager generates a key event corresponding to the instruction if the instruction is valid for the any of the titles, and transmits the key event to the application in the executable state,
wherein if the receiving step receives the instruction during an AV playback by the playback unit, the control step changes a current playback speed to a speed that corresponds to a predetermined speed level, and outputs a key event corresponding to the instruction to the application,
wherein the predetermined speed level is a speed level slower than a normal speed level of the playback step or a speed level for pausing the AV playback, and
wherein in the control step, an instruction to perform the AV playback at the predetermined speed level is provided before the key event is transmitted by the user event manager.

* * * * *